(12) United States Patent
Gold

(10) Patent No.: US 7,386,026 B1
(45) Date of Patent: Jun. 10, 2008

(54) METHOD AND SYSTEM FOR SYNCHRONIZING AND SELECTIVELY ADDRESSING MULTIPLE RECEIVERS IN A WIRELESS, SPREAD SPECTRUM COMMUNICATION SYSTEM

(75) Inventor: Robert Gold, Los Angeles, CA (US)

(73) Assignee: Robert Gold Communication Systems, Inc., Los Angeles, CA (US)

( * ) Notice: Subject to any disclaimer, the term of this patent is extended or adjusted under 35 U.S.C. 154(b) by 1997 days.

(21) Appl. No.: 09/832,067

(22) Filed: Apr. 9, 2001

(51) Int. Cl.
*H04B 1/69* (2006.01)
*H04B 1/707* (2006.01)
*H04B 1/713* (2006.01)
*H04B 1/00* (2006.01)

(52) U.S. Cl. ............... 375/130; 375/132; 375/133; 375/134; 375/136; 375/137; 375/140; 375/141; 375/145

(58) Field of Classification Search ........ 375/130–153, 375/354–376, E1.001–E1.037; 380/46
See application file for complete search history.

(56) References Cited

U.S. PATENT DOCUMENTS

| | | | | |
|---|---|---|---|---|
| 5,598,476 A | * | 1/1997 | La Barre et al. | 380/46 X |
| 5,734,986 A | * | 3/1998 | Helders | 375/133 X |
| 6,084,905 A | | 7/2000 | Ishifuji et al. | |
| 6,088,595 A | | 7/2000 | Ciccone et al. | |
| 6,115,407 A | | 9/2000 | Gendel et al. | 375/132 |
| 6,148,020 A | | 11/2000 | Emi | 375/132 |

OTHER PUBLICATIONS

Dixon, Robert C., *Spread Spectrum Systems with Commercial Applications*, Third Edition, John Wiley & Sons, Inc., 1994, pp. 32-58, 205-216, 220-254.

* cited by examiner

*Primary Examiner*—Bernarr E Gregory
(74) *Attorney, Agent, or Firm*—Irell & Manella LLP

(57) ABSTRACT

A system and method for synchronizing and selectively addressing multiple receivers in a wireless communication system includes a spread spectrum transmitter and one or more spread spectrum receivers. The transmitter transmits a signal having an observable parameter which is pseudo-randomly varied. The receiver measures the relative times between recurrences of a selected value of the observable parameter being pseudo-randomly varied, and determines an initial state of the transmitter based upon the measured relative times. The receiver then synchronizes itself to the estimated current state of the transmitter using the determined initial state as a starting reference. In a frequency hopping embodiment, the spread spectrum transmitter comprises a feedback shift register, and transmits a sequence of pseudo-randomly hopped frequencies determined by the shift register. A receiver is tuned to one of the hopping frequencies, measures the relative times of arrival between consecutive transmissions, and determines the initial code word in the transmitter feedback shift register from the measured relative times of arrival by constructing and solving a set of linear equations. The receiver then matches comprises its feedback shift register to the initial code word, adjusted by an amount of time elapsed during the synchronization process. Similar techniques may also be applied both to direct sequence spread spectrum communication systems.

43 Claims, 10 Drawing Sheets

Ten Stage Hopper Configuration

Code (8) and Associated Sequence of Frequencies

Ten Stage Modular Register

METHOD AND SYSTEM FOR SYNCHRONIZING AND SELECTIVELY ADDRESSING MULTIPLE RECEIVERS IN A WIRELESS, SPREAD SPECTRUM COMMUNICATION SYSTEM

GOVERNMENT INTERESTS

Pursuant to 35 U.S.C. § 202, the United States Government has a paid-up license in this invention and the right in limited circumstances to require the patent owner to license others on reasonable terms as provided for by the terms of contract nos. F33615-01-C-1800 and F33615-00-C-1645 awarded by the United States Air Force Research Laboratory.

BACKGROUND OF THE INVENTION

1) Field of the Invention

The field of the present invention relates to wireless communication systems and, more particularly, to techniques for synchronizing and selectively addressing multiple receivers in a wireless, spread-spectrum communication system.

2) Background

Spread spectrum communication, a technique for transmitting and receiving signal over a bandwidth wider than the data to be transmitted, has in recent years become widely for both military and commercial applications. Its advantages include, for example, resistance to interference, low power density (and hence minimal creation of interference) over the transmission frequency band, and security of communications.

The two most common spread spectrum communication techniques are generally referred to as direct sequence spread spectrum (DSSS) communication and frequency hopping spread spectrum (FHSS) communication.

Direct sequence spread spectrum communication involves direct sequence modulation of a carrier signal, which is a known technique for generating wide-band, low power density signals which have statistical properties similar to random noise. In a direct sequence spread spectrum communication system, the data to be transmitted is generally encoded in some fashion, in a manner which causes the signal to be "spread" over a broader frequency range and also typically causes the signal power density to decrease as the frequency bandwidth is spread. In a common method of direct-sequence spread spectrum modulation, a pseudo-random chip sequence (also called a pseudo-noise code sequence or a PN code sequence) is used to encode data which is then placed on a carrier waveform. The chipping rate of the pseudo-random sequence is usually much higher than the data rate. The resulting encoded signal is generally spread across a bandwidth exceeding the bandwidth necessary to transmit the data, hence the term "spread spectrum".

At the receiver, the signal is decoded, which causes it to be "despread" and allows the original data to be recovered. The receiver produces a correlated signal in response to the received spread spectrum signal when it is able to match the chip sequence to a sufficient degree. To do so, the receiver generates the same pseudo-random chip sequence locally, synchronizes its chip sequence to the received chip sequence, and tracks the signal by maintaining synchronization during transmission and reception of data.

Frequency hopping spread spectrum communication also involves a pseudo-random (i.e., spreading) code, but the code is used to select a series of frequencies rather than as information for directly modulating a carrier, as is generally done in direct sequence spread spectrum communication. In a very broad aspect, frequency hopping spread spectrum communication may be viewed as a type of frequency shift keying, but with many more frequency choices which are selected by use of the spreading code. In what is known as "fast" frequency hopping, a number of frequency changes or "hops" are carried out during the time period of sending one or more data symbols—e.g., a set of data bits—wherein the number of frequency changes or hops is greater than the number of data symbols to be transmitted. In "slow" frequency hopping, on the other hand, one or more data symbols is transmitted during each hopping interval.

In one type of frequency hopping spread spectrum communication, the frequency hopping transmitter includes a code generator and a rapid-response frequency synthesizer capable of responding to the coded output from the code generator. During each frequency hopping interval, a set of selected code bits are used to determine which frequency will be transmitted. Data may be transmitted in any way available to other communication systems, and in either analog or digital form. For example, a number of discrete data bits may be transmitted during each frequency hopping interval. Alternatively, a single data bit may be transmitted over a large number of frequency hopping intervals.

A frequency hopping receiver, like the transmitter, also typically includes a code generator and rapid-response frequency synthesizer. The received frequency hopping signal is then mixed with a locally generated replica of the transmitted signal (which may be offset by a fixed intermediate frequency) such that modulation of the received signal and the locally generated replica produces a constant difference frequency when the transmitter and receiver are in synchronism. Once the spread spectrum modulation is removed, the de-hopped signal is then processed to demodulate the transmitted information.

Both direct sequence and frequency hopping spread spectrum communication techniques may be used in the formation of a multiple access communication system. Distinct spreading codes can be used to distinguish transmissions, thereby allowing multiple simultaneous communication. Different users within a wireless communication system may, using distinct spreading codes, thereby transmit simultaneously over the same frequency without necessarily interfering with one another, particularly if the codes in use are selected to be orthogonal with respect to one another. A multiple-access communication system in which transmissions are distinguished according to the code used to encode the transmission is sometimes referred to as a code division multiple access (CDMA) communication system, which may be either a direct sequence or a frequency hopping spread spectrum system.

In either a frequency hopping or direct sequence spread spectrum communication system, the requirement of synchronization by the receiver has generally been a problem in the art. This requirement generally increases the difficulty of initially acquiring a spread spectrum signal, especially in a noisy environment, and also can cause difficulty in tracking and/or maintaining spread spectrum communication after established. Synchronization and tracking requirements often translate into additional circuit complexity at the receiver and increased cost, and may impose operational constraints on the communication system. For example, the extra time required to achieve synchronization can degrade the efficiency of the communication system, and may be detrimental in systems requiring very rapid establishment of a communication link.

In a frequency hopping system, in the absence of synchronization, the receiver must monitor all possible frequencies due to the otherwise unpredictable nature of the frequency hopped signal, which forces the receiver to employ a large number of synthesizers or even an array of distinct receivers. For example, the receiver may need to sample all of the possible frequency inputs at once, and then to select the channel with the largest signal in a given frequency hopping interval as the correct one. In order to monitor each possible frequency, the received signal is envelope detected and then band-pass filtered at each of the possible frequencies, with the largest of the filtered signals during a frequency hopping interval being deemed the transmitted frequency at that instant. This type of receiver design, however, has the drawback of requiring a potentially large number of band pass filters, one filter for each possible frequency.

If proper synchronization is achieved, on the other hand, it is possible to use a single (typically relatively high speed) frequency synthesizer to demodulate the incoming frequency hopped signal.

One technique for attempting to acquire synchronization of a frequency hopped signal is disclosed in U.S. Pat. No. 6,148,020. According to the technique disclosed therein, a frequency hopping receiver repeatedly mixes a partial code string which is part of the spreading code sequence for frequency hopping with the received signal. The receiver then attempts to synchronize by judging the detection level of a predetermined frequency. When the partial code string to be mixed coincides with part of the original code sequence, the detection level is presumed to become sufficiently large such that the receiver is judged to be in synchronization with the transmitter.

An alternative to the above-referenced technique is to use a preamble to attempt to synchronize a frequency hopping receiver. Such a technique is disclosed, for example, in U.S. Pat. No. 6,084,905. As described therein, a frequency hopping transmitter transmits a continuous wave in a first field of a preamble field of a communication frame, then transmits a carrier which is modulated with a symbol timing signal in a second field in the preamble field, followed by transmission information. A timing recovery circuit in the receiver uses the preamble to help establish synchronization. In the particular system described in the foregoing patent, a synchronous frame is broadcast as a reference for each frequency hopping equipment in the communication system.

Besides difficulties in achieving synchronization in spread spectrum systems, it can also be challenging, particularly in multiple access communication systems, for a receiver to be aware of when a transmitter is attempting to transmit information to it. This can be particularly difficult in military and other applications in which secrecy is paramount.

In various situations it can be advantageous for a transmitter to be able to selectively transmit a broadcast transmission to only one or a few receivers from many possible receivers, and to exclude from reception those receivers to which the communication is not directed. However, few, if any, techniques exist for such selective broadcast. No known technique exists for selectively broadcasting a transmission only to one or a specified group of receivers from many possible receivers, without at least requiring participation of the receivers in the excluded group.

It would therefore be advantageous to provide a communication technique that provides improved synchronization and the capability of selectively addressing receivers, and which overcomes the drawbacks, disadvantages or limitations of conventional techniques.

SUMMARY OF THE INVENTION

The invention in one aspect provides a system and method for synchronizing and selectively addressing multiple receivers in a wireless communication system.

In one aspect, a method or system for synchronizing communication includes the steps of transmitting, from a transmitter, a signal having an observable parameter which is pseudo-randomly varied, and receiving the signal at a receiver. The receiver measures the relative times between recurrences of a selected value of the observable parameter being pseudo-randomly varied, and determines an initial state of the transmitter based upon the measured relative times. The receiver then synchronizes itself to the estimated current state of the transmitter using the determined initial state as a starting reference.

In one embodiment, a wireless, spread-spectrum communication system includes one or more spread spectrum transmitters and one or more spread spectrum receivers. A spread spectrum transmitter comprises a feedback shift register and transmits a sequence of pseudo-randomly hopped frequencies determined by the shift register. Each of the one or more spread spectrum receivers is tuned to one of the frequencies of the many over which the transmitter hops. Each spread spectrum receiver tuned to its unique predetermined frequency measures the relative times of arrival between consecutive transmissions, and determines, using the techniques of the invention, the initial code word in the transmitter feedback shift register from the measured relative times of arrival. The spread spectrum receiver comprises a receiver feedback shift register configured in the same manner as the transmitter feedback shift register, and matches the receiver feedback shift register to the initial code word, adjusted by an amount of time elapsed during the synchronization process. The receiver feedback shift register is then used to carry out synchronized communication with the spread spectrum transmitter.

In a preferred embodiment, a synchronization algorithm utilizing the measured relative times of arrival of transmissions on the predetermined frequency is employed by the receiver. The synchronization algorithm derives a number of equations upon receipt of each transmission on the predetermined frequency, based upon the knowledge of encoding at the transmitter, by relating a set of unknowns to the known encoding bits through a transition matrix. When a sufficient number of equations has been built up, the set of equations may be solved, yielding the initial codeword in the transmitter feedback shift register. The initial transmitter codeword is then advanced or otherwise adjusted to compensate for the lag between the receiver and the transmitter, and synchronized communication is carried out thereafter.

Communication techniques as described herein may be applied both to frequency hopping spread spectrum communication systems and to direct sequence spread spectrum communication systems.

Further embodiments, variations and enhancements are also disclosed herein.

DETAILED DESCRIPTION OF THE PREFERRED EMBODIMENT

Figure 1:
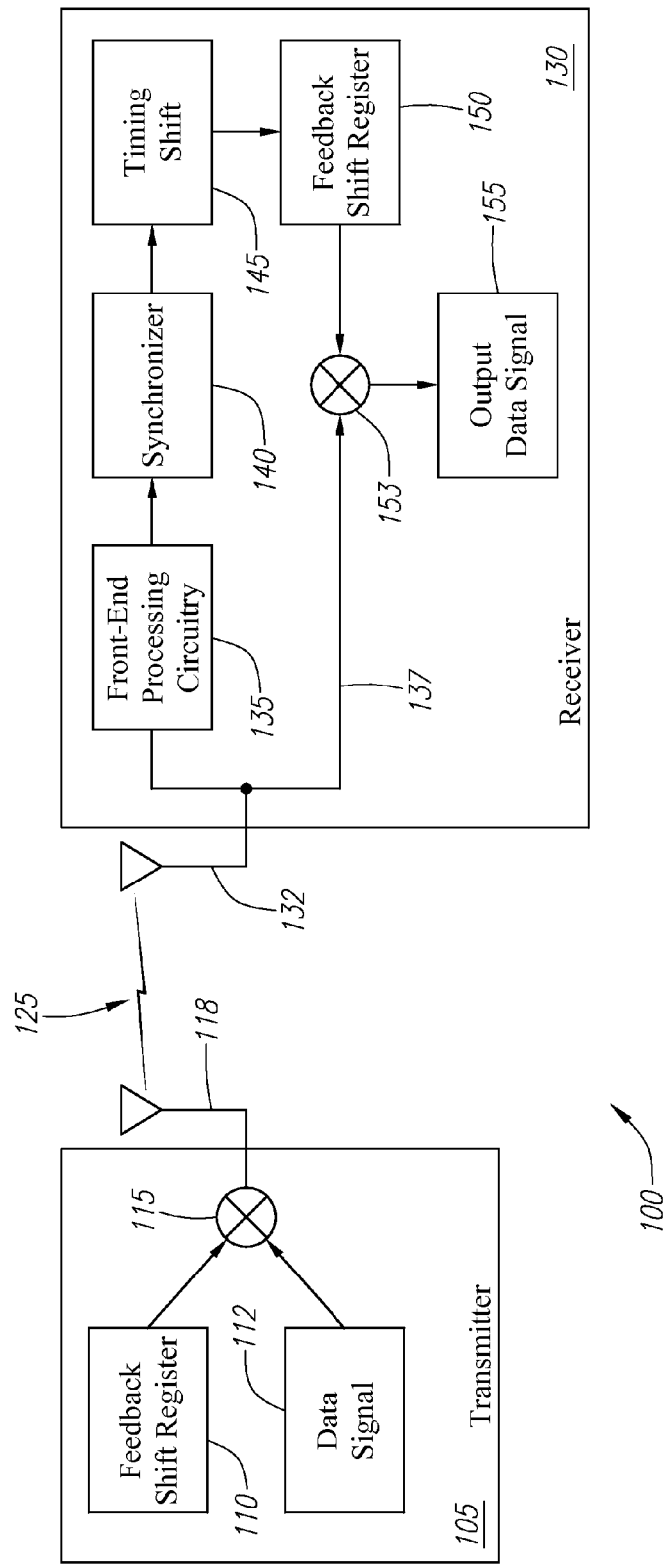
FIG. 1 is a top-level diagram of a system for wireless communication in which various techniques for achieving synchronization or for selectively addressing multiple receivers may be used.

FIG. 1 is a top-level diagram of a system 100 for wireless communication in which various techniques for achieving synchronization or for selectively addressing multiple receivers may be used. As illustrated in FIG. 1, the system 100 includes a spread spectrum transmitter 105 and a spread spectrum receiver 130. The spread spectrum transmitter 105 includes a feedback shift register 110 which outputs a spreading code, according to any of a variety of techniques as known in the art or otherwise described herein. The spreading code is modulated with a data signal 112 by modulator 115, resulting in a spread spectrum transmission signal that is transmitted over a wireless communication link 125 using transmitter antenna 118. The spread spectrum transmission signal may be transmitted over-the-air on a wireless radio frequency (RF) link, but could also by transmitted through other transmission media, such as modulated laser, ultrasound, or fluid.

At the receiver 130, a receiver antenna 132 receives the spread spectrum transmission signal and conveys it to front-end processing circuitry 135 and to a demodulator 153. In a frequency-hopping spread-spectrum system, the front-end processing circuitry 135 preferably comprises a band pass filter tuned to a selected frequency hopping "key" frequency (as further described herein) followed by an envelope detector or the equivalent. In a direct-sequence spread-spectrum system, the front-end processing circuitry 135 preferably comprises a despreading circuit, such as a spread-spectrum correlator for detecting spread-spectrum encoded pulses, as further described herein. The demodulator 153 outputs the signal to a synchronizer 140, which preferably operates according to techniques as described herein for detecting the proper synchronization between the receiver 130 and the transmitter 105. A timing shift circuit 145 is preferably employed to properly align the receiver spreading code with the transmitter spreading code, so as to allow proper demodulation of the received spread spectrum transmission signal. When the receiver feedback shift register 150 is properly aligned with the received code the output data signal 155 is obtained. The receiver feedback shift register 150 is preferably configured the same as the transmitter feedback shift register 110 (e.g., same number of delay stages, same number and location of taps, etc.), so that when both the transmitter feedback shift register 110 and receiver feedback shift register 150 have the same contents, the transmitter 105 and receiver 130 can communicate in synchronization. The receiver feedback shift register 150 outputs a receiver spreading code to the demodulator 153, which outputs a data signal 155 for further processing.

Figure 2:
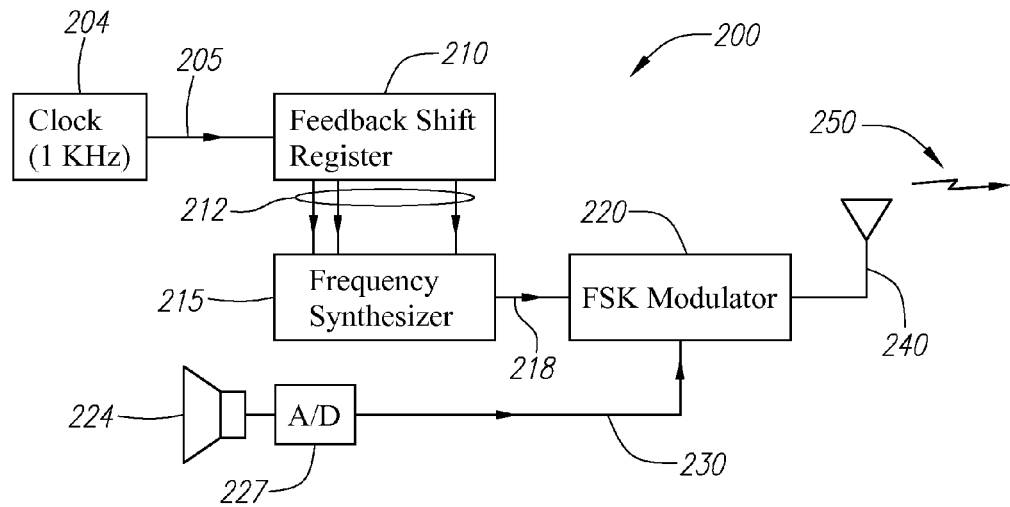
FIG. 2 is a diagram of a preferred spread-spectrum transmitter as may be used, for example, in the system of FIG. 1.

FIG. 2 is a diagram of a preferred spread-spectrum transmitter 200 as may be used, for example, in the system 100 of FIG. 1. The particular spread-spectrum transmitter 200 illustrated in FIG. 2 is a frequency-hopping variety, but, as will be explained in more detail later herein, direct-sequence spread-spectrum communication may also be used. The transmitter 200 shown in FIG. 2 preferably comprises a feedback shift register 210 which is clocked by a clocking signal 205 output from a clock circuit 204 at the designated hopping rate. The feedback shift register 210 outputs a spreading code, the nature of which depends upon the number of stages of the feedback shift register 210, the number and location of feedback taps for the feedback shift register 210, and the initial codeword or contents of the feedback shift register 210. Each clocking cycle, the contents of the feedback shift register 210 changes. One or more of the elements of the codeword in the feedback shift register 210 may be read out each clocking cycle and used as an input to a frequency synthesizer 215, which outputs a sequence of frequencies based upon the content of the one or more code elements.

Figure 4:
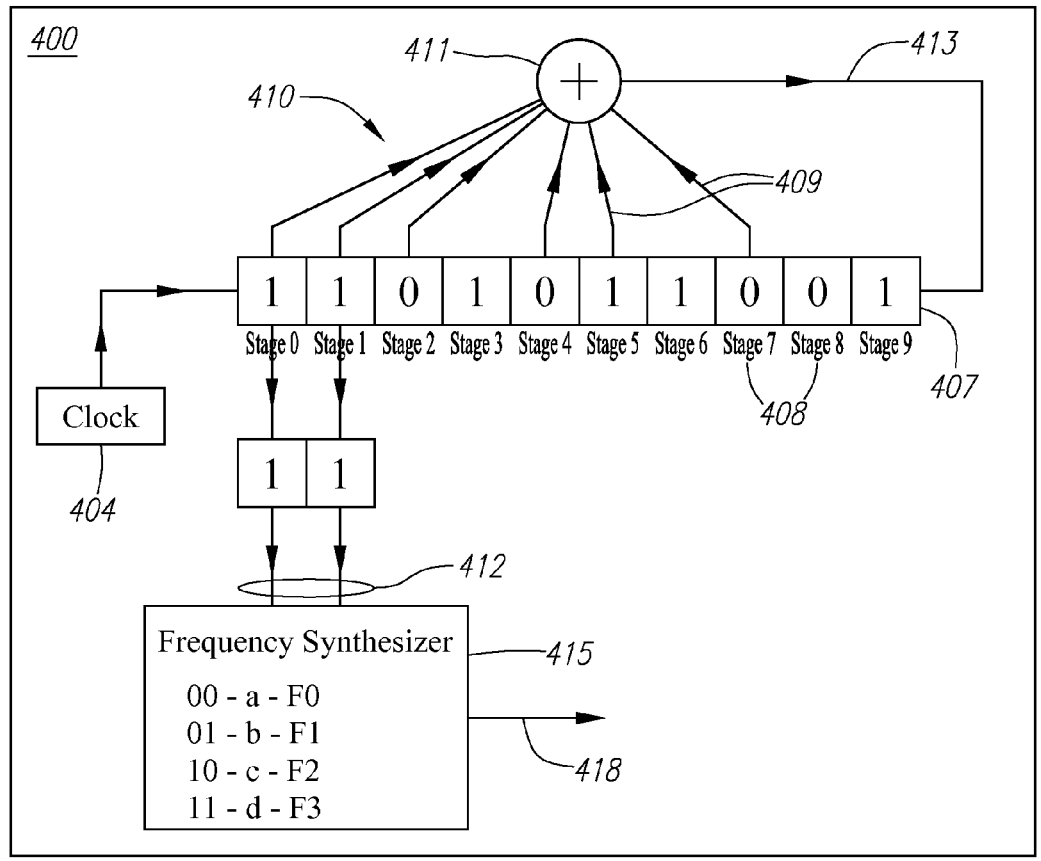
FIG. 4 is a diagram illustrating further details of an example of a frequency hopping code sequence generator, as may be utilized in the transmitter of FIG. 2, using a feedback shift register to generate a signal for transmission.

This portion of the operation of the spread spectrum transmitter 200 may be explained in more detail with reference to FIG. 4, which is a diagram illustrating an example of a frequency hopping code sequence generator 400 having a feedback shift register 410 for generating a spread spectrum transmission signal. As illustrated in FIG. 4, the frequency hopping code sequence generator 400 includes a clock 404 which serves a purpose similar to the clock 204 illustrated in FIG. 2, connected to the tapped shift register 407 having feedback connections. The tapped shift register 407 comprises a plurality of delay stages 408—in the example of FIG. 4, it has ten delay stages 408, but in the general case it may have N delay stages 408. The tapped shift register 407 may therefore hold up to N code elements (or "chips") at a given time, one in each of the N delay stages 408. The tapped shift register 407 is configured with a plurality of taps 409 (e.g., six taps 409 in the instant example shown in FIG. 4, at delay stages 0, 1, 2, 3 5 and 7) to provide feedback for code generation. Taps 409 from selected delay stages 408 are input to an exclusive-OR logic gate 411 (or the equivalent in functionality) which performs a modulo-2 additive operation on the chips in delay stages 408 which are connected to the exclusive-OR logic gate 411 by the taps 409. An output signal 409 from the exclusive-OR logic gate 411 is fed back to the input (i.e., first delay stage 408) of the tapped shift register 407. The tapped shift register 407, taps 409 and exclusive-OR logic gate 411 collectively comprise a feedback shift register 410. The feedback taps 409 of the tapped shift register 407 dictate the type of code that will be output. For example, if the feedback taps 409 correspond to a linear maximal code sequence, then the resulting code output will also be a linear maximal code sequence.

Further discussion of tapped shift registers, including their relationship to the generation of linear and nonlinear maximal code sequences, may be found, for example, in R. Dixon, *Spread Spectrum Systems with Commercial Applications* (J. Wiley & Sons, 3d ed. 1994), hereby incorporated by reference as if set forth fully herein.

As further illustrated in FIG. 4, selected delay stages 408 are utilized in generating a frequency select signal 412 that is fed to a frequency synthesizer 415, for generating a frequency hopping output signal 418. One or more of the delay stages 408 may be used for the frequency select signal 412. If only one delay stage 408 is used, then only two frequencies can be available for frequency hopping. If two delay stages 408 are used, then up to four frequencies can be available for frequency hopping. In the general case of M delay stages 408 being selected (where M≦N), up to $2^M$ frequencies can be available for frequency hopping. In the instant example shown in FIG. 4, two delay stages 408 are used as the frequency select signal 412 (which essentially forms a two-bit binary word), so up to four frequencies can be available for frequency hopping.

Figure 5:
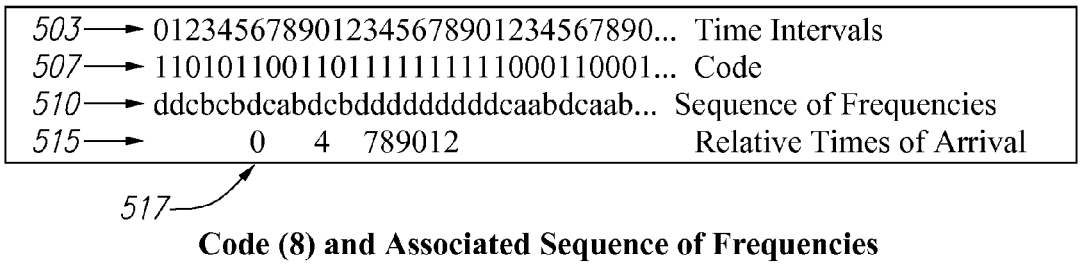
FIG. 5 is a diagram illustrating sequences of frequencies as may be output from the frequency hopping code sequence generator of FIG. 4.

The frequency synthesizer 415 receives the frequency select signal 412 from the selected delay stages 408, and outputs a sequence of frequencies in a random-like pattern based upon the progression of the frequency select signal 412 from clock cycle to clock cycle. FIG. 5 is a diagram illustrating sequences of frequencies as may be output from the frequency hopping code sequence generator 400 of FIG. 4. Shown in FIG. 5 is a series of time intervals 503, in connection with a length-31 repeating code having code elements 507 output from the tapped shift register 407 as illustrated for each time interval. The first ten code elements 507, that is, "1101011001," match the initial codeword (i.e., initial contents, or selected code of the day) of the tapped shift register 407. The following code elements 507, that is, "1011 . . . ," correspond to the output of the tapped shift register 407 based upon the code for which the taps 409 are configured. Each clocking interval, the code elements in stage-0 and stage-1 of the delay stages 408 are used as the frequency select signal 412 to select one of four different frequencies (F0, F1, F2 and F3). In the example shown, the frequencies F0, F1, F2 and F3 are encoded so as to correspond to select signals 00, 01, 10 and 11, respectively (for convenience, designated as frequencies a, b, c and d, respectively). The resulting sequence of frequencies 510 generated by the frequency select signal 412 taken from the tapped shift register 407 is illustrated in FIG. 5. For example, in time interval 1, the frequency select signal 412 is "11" or "d". In time interval 2, the frequency select signal 412 is "10" or "c". (The frequency select signal 412 at time interval 0 can either be selected to have the same value as at time interval 1, or else can be based upon the code element in stage-0 of the tapped shift register 407 and the previous code element, if known). The result is a frequency hopping signal that hops sequentially starting from time interval 0, from frequency "d" (F3) to frequency "d" (F3), to frequency "c" (F2), to frequency "b" (F1), and so on, as shown by the sequence of frequencies 510 in FIG. 5.

The frequency hopping code sequence generator 400 shown in FIG. 4 is capable of generating any of the family of thirty-two binary codes (each having 31 code elements) which appear below in Table 4-1, each of which happen to be Gold codes. However, the invention is applicable to many other types of code sequences, including various linear maximal and non-maximal codes.

TABLE 4-1

|  | 0123456789012345678901234567890 |
|---|---|
| (1) | 1001101001000010101110110001111 |
| (2) | 1100000011001100010000100010111 |
| (3) | 1101011000101100111110101011011 |
| (4) | 1011011000001011100011110000011 |
| (5) | 1111101100101<u>001</u>0<u>00000</u>01111101 |
| (6) | 1010000110100110011110011100101 |
| (7) | 1000110011100001000001010101001 |
| (8) | <u>1101011001</u>1011111111000110001 |
| (9) | 1111000001111001010111111101110 |
| (10) | 1010101011110111101001101110110 |
| (11) | 1000011110110000101101001110010 |
| (12) | 1101110100111110001000110100010 |

TABLE 4-1-continued

```
            0123456789012345678901234567890
    (13)    10010001000100110110010000111100
    (14)    11001011100111011001110100000100
    (15)    11100110110110101110000110010000
    (16)    10111100010101000001100101010000
    (17)    00101111010111110100100010111111
    (18)    01110101110100011011000001001111
    (19)    01011000100101101100110011001011
    (20)    00000010000110000110101111100011
    (21)    01001110001101010111001010011011
    (22)    00010100101110111000101110101101
    (23)    00111001111111001111011110011001
    (24)    01100011011100100000111000000001
    (25)    01000101011000010101011011011110
    (26)    00011111111010100101010010000010
    (27)    00110010101011010010100000010101
    (28)    01101000001000111101000100010010
    (29)    00100100000011101001011001011100
    (30)    01111101000000001011111010110100
    (31)    01010011100011100010011111111000
    (32)    0000100101001001111010101100000
    (33)    10010011000010110101000111011111
```

The particular code sequence that will be generated depends upon the initial contents of the tapped shift register 407. In the present example, code (8) from Table 4-1 corresponds to the initial contents of the tapped shift register 407, so the output of the frequency hopping code sequence generator 400 will be "1010110011011111111 . . . " By selecting a different initial code sequence, any other of the code sequences from Table 4-1 may be generated by the feedback shift register 410 of FIG. 4.

In the example illustrated in FIGS. 4 and 5, two delay stages 408 were used for the frequency select signal 412, resulting in up to four frequencies F0, F1, F2 and F3 being available for frequency hopping. If more delay stages 408 are used for the frequency select signal 412, more frequencies would be available for frequency hopping. The delay stages 408 used for the frequency select signal 412 need not be contiguous. It may be appreciated by those skilled in the art that the parameters of the particular frequency hopping code sequence generator 400 shown in FIG. 4 would be too small to be of practical application in many situations; nevertheless, it is useful to illustrate certain principles of the present invention.

The frequency hopping code sequence generator 400 of FIG. 4 may be incorporated in a transmitter (such as transmitter 200 shown in FIG. 2) and used to generate a code sequence for modulating a data signal. For example, the output of the frequency synthesizer 215 may be used to modulate an audio signal (or other analog or digital data signal). In the example shown in FIG. 2, an audio signal 224 is output from a microphone 224 and fed to an analog-to-digital (A/D) converter 227, which outputs a digital converted data signal 230 to a frequency-shift-keyed (FSK) modulator 220. The digital converted data signal 230 is mixed with the sequence of frequencies output from the frequency synthesizer 215, resulting in a frequency hopping transmission signal, which is transmitted via antenna 240 over a wireless communication link.

Figure 3:
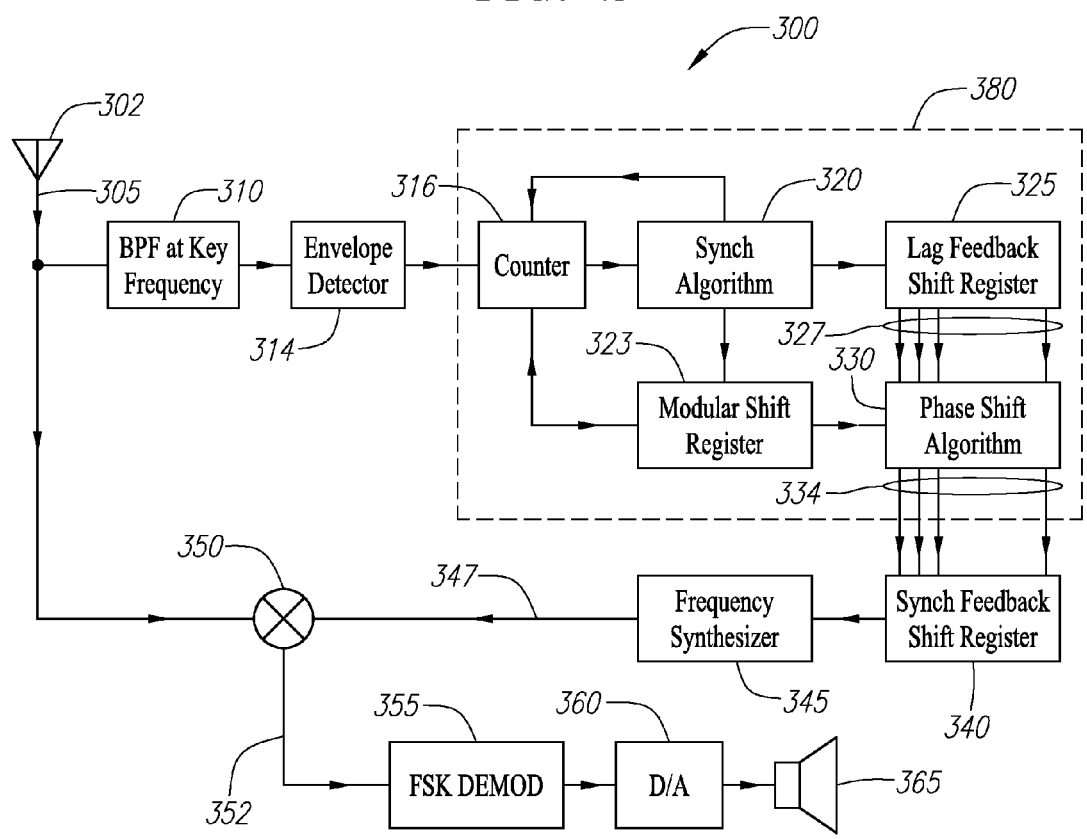
FIG. 3 is a diagram of a preferred spread spectrum receiver as may be used, for example, in the system of FIG. 1.

FIG. 3 is a diagram of a preferred spread spectrum receiver 300 as may be used, for example, in the system of FIG. 1, to receive, synchronize to, and despread the frequency hopping transmission signal. The receiver 300 incorporates similar general features as the receiver 130 illustrated in FIG. 1, but also shows further details in accordance with a preferred embodiment. The receiver 300 illustrated in the embodiment of FIG. 3 comprises an initial synchronization section generally comprising a band pass filter 310, an envelope detector 314, and a synchronizer 380. The receiver 300 further comprises a receiver feedback shift register 340 and a frequency synthesizer 345, which outputs, when synchronized properly with the transmitter, a sequence of frequencies matching those of the transmitted signal. A multiplier 350 down-converts the received frequency hopping transmission signal based upon the sequence of frequencies output from the frequency synthesizer 345. The down-converted signal 352 is, in the example of FIG. 3, provided to a frequency-shift keyed (FSK) demodulator 355, which demodulates the FSK encoding to the data signal that was applied by the transmitter. The demodulated signal output from the FSK demodulator 355 may be used in further processing; for example, it may be fed to a digital-to-analog converter 360 and then to a speaker 365, whereby the audio data (or other original analog or digital signal) may be output.

Further details will now be explained about the initial synchronization operation of the receiver 300 shown in FIG. 3. The receiver 300 "selects" (e.g., is assigned) one frequency of the available frequency hopping frequencies to monitor in order to detect and synchronize to the frequency hopping transmission signal. This selected (or assigned) frequency may be referred to as the "key" frequency. The receiver 300 uses relative times-of-arrival of occurrence on the key frequency in order to rapidly determine the initial contents of the transmitter feedback shift register (as of the moment when the receiver 300 initially detected the first occurrence of the key frequency), and then to align the receiver feedback shift register to the transmitter feedback shift register. As an example, the key frequency for the receiver 300 may be selected or assigned to be frequency F3 (i.e., frequency "d"). The receiver 300 need not commence listening at the start of the code sequence output by the transmitter, but may start listening at any point in the transmission. In the example illustrated in FIG. 5, it is assumed that the receiver 300 starts observations of frequency "d" at the $6^{th}$ term 517 of the transmitted sequence (i.e., at the $6^{th}$ clock interval). By continuing to monitor only on frequency "d", the receiver 300 will further detect transmissions at that frequency at the $10^{th}$ term, $13^{th}$ term, $14^{th}$ term, and so on. However, the times-of-arrival of the transmissions over frequency "d" are measured with respect to the first detected transmission. Therefore, the relative times-of-arrival are at clock intervals 0, 4, 7, 8, 9, 10, 11, 12 and so on. As will be shown, it is sufficient for achieving synchronization that the number of occurrences of the key frequency be equal to the number of delay stages 408 of feedback shift register divided by the number of stages that are tapped for input to the frequency synthesizer. Thus in the present example the number of relative times of arrival of the key frequency required would be:

$$\frac{10 \text{ shift register stages}}{2 \text{ tapped stages}} = 5 \text{ relative times of arrival required by the algorithm}$$

In order to detect transmissions at the key frequency, the receiver 300 preferably passes the received frequency hopping transmission signal 305 into a band pass filter 310 which is centered at the key frequency. The band-pass filtered signal is input to an envelope detector 314, which may be constructed according to any of a variety of techniques well known in the art. The envelope detector 314 includes a threshold circuit (not shown) or the equivalent decision circuitry, and when the envelope of the signal at frequency "d" exceeds the threshold, a detection event is declared. The detection events are conveyed to the synchronizer 380, which uses the time-of-arrival information to achieve initial synchronization with the transmitter.

The first detection event output from the envelope detector 314 enables a counter 316 utilized in the synchronizer 380. Each incidence of the key frequency in the received frequency hopping transmission signal 305 causes the counter 316 to output its value to the synchronization algorithm 320 (which may be programmed, for example, into a processor, not shown in FIG. 3). Thus, in the example of FIG. 5 previously described, the output of the counter 316 would be: 0, 4, 7, 8, 9, 10, 11, 12, etc.

The synchronization algorithm 320 computes the binary word that was in the transmitter feedback shift register 410 at the time the transmitter generated the first occurrence of the key frequency observed by the receiver 300. The computed binary word is then temporarily loaded into a "lag" feedback shift register 325, and advanced in time using a phase shift algorithm 330, which may be implemented by a phase shift circuit (preferably comprising digital logic or a programmed processor). The time-advanced binary word output from the phase shift algorithm 330 is loaded into the receiver feedback shift register 340, and used for controlling the frequency synthesizer 345 to effectuate demodulation of the received frequency hopping transmission signal.

The synchronization algorithm 320 makes use of a transition matrix of the feedback shift register 410 in order to facilitate determination of the initial binary word that was in the transmitter feedback shift register 410 at the time it first transmitted an instance of the key frequency that was detected by the receiver 300. The transition matrix of an N-stage feedback shift register may generally be defined as the N×N binary matrix whose product with a binary word in the shift register is that binary word which occurs in the shift register at the next clock pulse. For example, for a 10 stage shift register with feedback taps given by $[a_0, a_1 \ldots a_9]$ where $a_i = 0$ or 1 depending upon whether or not there is a feedback tap to the $i^{th}$ stage, the transition matrix from the current binary word in the shift register to the next binary word is given by:

$$A = \begin{bmatrix} 0 & 0 & 0 & 0 & 0 & 0 & 0 & 0 & 0 & a_0 \\ 1 & 0 & 0 & 0 & 0 & 0 & 0 & 0 & 0 & a_1 \\ 0 & 1 & 0 & 0 & 0 & 0 & 0 & 0 & 0 & a_2 \\ 0 & 0 & 1 & 0 & 0 & 0 & 0 & 0 & 0 & a_3 \\ 0 & 0 & 0 & 1 & 0 & 0 & 0 & 0 & 0 & a_4 \\ 0 & 0 & 0 & 0 & 1 & 0 & 0 & 0 & 0 & a_5 \\ 0 & 0 & 0 & 0 & 0 & 1 & 0 & 0 & 0 & a_6 \\ 0 & 0 & 0 & 0 & 0 & 0 & 1 & 0 & 0 & a_7 \\ 0 & 0 & 0 & 0 & 0 & 0 & 0 & 1 & 0 & a_8 \\ 0 & 0 & 0 & 0 & 0 & 0 & 0 & 0 & 1 & a_9 \end{bmatrix}$$

Thus, if $[z_0, z_1 \ldots z_9]$ is the binary word in the transmitter feedback shift register 410 at a given clock pulse, then the binary word $[z_1, z_2 \ldots z_{10}]$ of the register after the next clock pulse is given by the matrix multiplication $[z_0, z_1 \ldots z_9] \times A = [z_1, z_2 \ldots z_{10}]$. By extrapolating further, the binary word that will be present in the transmitter feedback shift register 410 after any arbitrary number of clock pulses p is generally given by the matrix multiplication:

$$[z_0, z_1 \ldots z_9] \times A^p = [z_p, z_{p+1} \ldots z_{p+9}].$$

As a concrete example, the transition matrix for the ten-stage feedback shift register 410 of the example shown in FIG. 4 is given by:

$$A = \begin{bmatrix} 0 & 0 & 0 & 0 & 0 & 0 & 0 & 0 & 0 & 1 \\ 1 & 0 & 0 & 0 & 0 & 0 & 0 & 0 & 0 & 1 \\ 0 & 1 & 0 & 0 & 0 & 0 & 0 & 0 & 0 & 1 \\ 0 & 0 & 1 & 0 & 0 & 0 & 0 & 0 & 0 & 0 \\ 0 & 0 & 0 & 1 & 0 & 0 & 0 & 0 & 0 & 1 \\ 0 & 0 & 0 & 0 & 1 & 0 & 0 & 0 & 0 & 1 \\ 0 & 0 & 0 & 0 & 0 & 1 & 0 & 0 & 0 & 0 \\ 0 & 0 & 0 & 0 & 0 & 0 & 1 & 0 & 0 & 1 \\ 0 & 0 & 0 & 0 & 0 & 0 & 0 & 1 & 0 & 0 \\ 0 & 0 & 0 & 0 & 0 & 0 & 0 & 0 & 1 & 0 \end{bmatrix}$$

As a further example illustrating how the transition matrix can be used to arrive at the contents of the feedback shift register after an arbitrary number of clock pulses, it may be noted that, in code sequence (8) defined in Table 4-1, the binary words [1101011001] and [0110011011] appear four clock pulses apart. The binary codeword [0110011011] can be derived from the initial binary codeword [1101011001] by first deriving a transition matrix based upon four clock pulses or code element intervals, and then by applying the initial binary codeword to the transition matrix. The transition matrix from a current binary word in the shift register to a binary word occurring a number of clock pulses p later is given by the expression $A^p$ (i.e, $A \times A \times \ldots \times A$, or A to the $p^{th}$ power). Derivation of the binary word in the feedback shift register 410 after, e.g., four clock pulses or code element intervals, may be made using the transition matrix as follows:

$$[1101011001] \times A^4 = \begin{bmatrix} 0 & 0 & 0 & 0 & 0 & 1 & 0 & 0 & 1 \\ 0 & 0 & 0 & 0 & 0 & 0 & 1 & 1 & 0 & 1 \\ 0 & 0 & 0 & 0 & 0 & 0 & 1 & 1 & 1 & 1 \\ 0 & 0 & 0 & 0 & 0 & 0 & 0 & 1 & 1 & 1 \\ 1 & 0 & 0 & 0 & 0 & 0 & 1 & 0 & 1 & 0 \\ 0 & 1 & 0 & 0 & 0 & 0 & 1 & 1 & 0 & 0 \\ 0 & 0 & 1 & 0 & 0 & 0 & 0 & 1 & 1 & 0 \\ 0 & 0 & 0 & 1 & 0 & 0 & 1 & 0 & 1 & 0 \\ 0 & 0 & 0 & 0 & 1 & 0 & 0 & 1 & 0 & 1 \\ 0 & 0 & 0 & 0 & 0 & 1 & 0 & 0 & 1 & 0 \end{bmatrix} = [0110011011]$$

Figure 6:
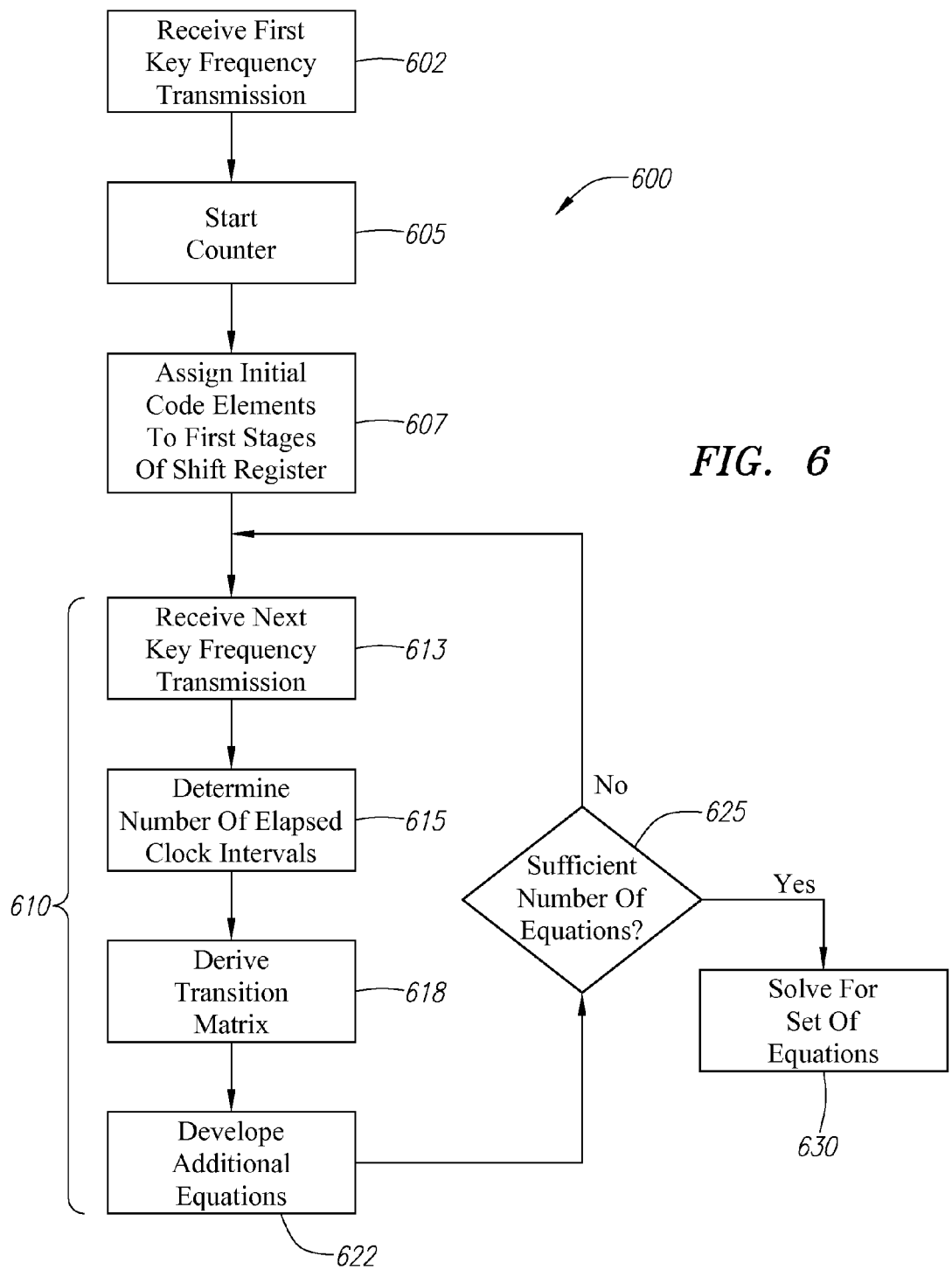
FIG. 6 is process flow diagram of a method for developing a system of equations to determine a binary word present in a transmitter feedback shift register.

Using the above-described properties of the transition matrix, a system of equations may be developed to determine the binary word present in the transmitter feedback shift register when the first detected key frequency is generated. A general methodology 600 for such a determination is illustrated in FIG. 6. Application of this methodology to a concrete example with reference to the frequency hopping code sequence generator 400 of FIG. 4 and the receiver 300 of FIG. 3 is described concurrently, to illustrate application of the methodology in the context of a practical application. As illustrated in FIG. 6, the method 600 involves, in a first step 602, receiving a first key frequency transmission. In a next step 605, the counter 316 is enabled (or reset, or else any other means of tracking elapsed time is commenced). In a next step 607, the method involves assigning the code values that are used to generate the key frequency to the appropriate locations in the transmitter feedback shift register, according to the encoding of the key frequency. This assignment can be made because, when the first key frequency is received at the receiver, it is known what the contents of the tapped delay stages in the transmitter feedback shift register had to be in order to generate the key frequency. In the example of the frequency hopping code sequence generator 400 of FIG. 4, when the first key frequency is received, it is known that stage-0 and stage-1 of the delay stages 408 of the feedback shift register 410 hold the code values [1,1], because key frequency "d" is encoded as "11". Thus, by assigning [1,1] to the first two delay stages 408 of the feedback shift register, the receiver can determine that the contents of the transmitter feedback shift register 410 are [1, 1, $x_2$, $x_3$, $x_4$, $x_5$, $x_6$, $x_7$, $x_8$, $x_9$], leaving eight unknowns.

Next in the method 600, a loop 610 is entered, in which relative arrival times of the key frequency transmissions are used in connection with further processing to eventually build up a set of equations that will allow determination of the initial contents of the binary codeword in the transmitter feedback shift register 410. For each received key frequency transmission (step 613), the number of intervening clock pulses (i.e., code element intervals) from the initially received key frequency transmission is determined, as indicated by step 615. In the example illustrated in FIGS. 4 and 5, the number of clock pulses would be 4, 7, 8, 9, etc.

In next steps 618 and 622 in the loop 610, for each received key frequency transmission, the transition matrix for the feedback shift register is advanced by the number of clock pulses for the particular key frequency transmission, and an equation is developed from each received key frequency transmission based upon the knowledge that the initial contents of the transmitter feedback shift register, advanced by the number of clock pulses to generate the next occurrence of the key frequency, will result in a set of code elements corresponding to the binary code for the key frequency. The result over several received key frequency transmissions is a set of equations that can be used to solve for the initial contents of the transmitter shift register.

Development of such a set of equations may be explained in more detail with reference once again to examples illustrated in FIGS. 4 and 5. For each received key frequency transmission, the transition matrix is raised to a power equal to the number of clock pulses (i.e., code element intervals) from the initial key frequency transmission to the current key frequency transmission, and the portion of the resultant transition matrix corresponding to the locations of the tapped delay stages is then used to form a new matrix that defines the specifics of the equations to be solved. It is helpful in this regard to introduce additional notation. As used herein, the term $A^p[q]$ represents a portion of the transition matrix A raised to a power equal to the number of clock pulses p, the portion being those columns associated with q taps of delay stages in the transmitter feedback shift register. For example, in relation to the frequency hopping code sequence generator 400 of FIG. 4, the expression $A^4[2]$ denotes the 10×2 matrix consisting of the first two columns of the 10×10 matrix $A^4$. (The first two columns are chosen because the first two delay stages 408 are tapped and thus yield the binary frequency select signal 412.) Thus, where a key frequency transmission is received at time interval 4, a 10×10 transition matrix $A^4$ is derived by advancing the matrix through four clock pulses, resulting in the following:

$$A^4 = \begin{bmatrix} 0 & 0 \\ 0 & 0 \\ 0 & 0 \\ 0 & 0 \\ 1 & 0 \\ 0 & 1 \\ 0 & 0 \\ 0 & 0 \\ 0 & 0 \\ 0 & 0 \end{bmatrix}$$

Taking the first two columns of the time-advanced 10×10 transition matrix results in a 10×2 matrix as follows:

$$A^4[2] = \begin{vmatrix} 0 & 0 \\ 0 & 0 \\ 0 & 0 \\ 0 & 0 \\ 1 & 0 \\ 0 & 1 \\ 0 & 0 \\ 0 & 0 \\ 0 & 0 \\ 0 & 0 \end{vmatrix}$$

and the resulting equations are given by $[1,1,x_2,x_3,x_4,x_5,x_6,x_7,x_8,x_9]A^4[2]=[1,1]$. Expanding out the equations represented by this relationship, two equations will remain:

$x_5=1$ $x_6=1$

The next relative time of arrival of a key frequency transmission is in time interval 7. Using the same approach, another two equations are derived by calculating a transition matrix $A^7$ based upon advancement by 7 clock pulses, and utilizing the first two columns of the transition matrix as a 10×2 matrix to set up the appropriate relationships. These steps are illustrated mathematically as follows:

$$A^7 = \begin{vmatrix} 0 & 0 \\ 0 & 0 \\ 0 & 0 \\ 0 & 0 \\ 0 & 0 \\ 0 & 0 \\ 0 & 0 \\ 0 & 0 \\ 1 & 0 \\ 0 & 1 \\ 0 & 0 \end{vmatrix}$$

$[1,1,x_3,x_4,x_5,x_6,x_7,x_8,x_9,x_{10}]A^7[2]=[1,1]$ and the resulting equations from the foregoing relationship are as follows:

$x_8=1$ $x_9=1$

The next relative time of arrival of a key frequency transmission is in time interval 8, leading to the following transition matrix $A^8$ and two further equations:

$$A^8 = \begin{vmatrix} 0 & 0 \\ 0 & 0 \\ 0 & 0 \\ 0 & 0 \\ 0 & 0 \\ 0 & 0 \\ 0 & 0 \\ 0 & 0 \\ 1 & 0 \\ 0 & 1 \end{vmatrix}$$

$[1,1,x_3,x_4,x_5,x_6,x_7,x_8,x_9,x_{10}]A^8[2]=[1,1]$ $x_9=1$ $x_{10}=1$

The next relative time of arrival of a key frequency transmission is in time interval 9, leading to the following transition matrix $A^9$ and two more equations:

$$A^9 = \begin{vmatrix} 0 & 1 \\ 0 & 1 \\ 0 & 1 \\ 0 & 0 \\ 0 & 1 \\ 0 & 1 \\ 0 & 0 \\ 0 & 1 \\ 0 & 0 \\ 1 & 0 \end{vmatrix}$$

$[1,1,x_3,x_4,x_5,x_6,x_7,x_8,x_9,x_{10}]A^9[2]=[1,1]$ $x_{10}=1$ $x_3+x_5+x_6+x_8=1$

The next relative time of arrival of a key frequency transmission is in time interval 10, leading to the following transition matrix $A^{10}$ and two more equations:

$$A^{10} = \begin{vmatrix} 1 & 0 \\ 1 & 1 \\ 1 & 1 \\ 0 & 1 \\ 1 & 0 \\ 1 & 1 \\ 0 & 1 \\ 1 & 0 \\ 0 & 1 \\ 0 & 0 \end{vmatrix}$$

$[1,1,x_3,x_4,x_5,x_6,x_7,x_8,x_9,x_{10}]A^{10}[2]=[1,1]$ $x_3+x_5++x_6+x_8=1$ $1+x_3+x_4++x_6+x_7+x_9=1$

The next relative time of arrival of a key frequency transmission is in time interval 11, leading to the following transition matrix $A^{11}$ and two more equations:

$$A^{11} = \begin{vmatrix} 0 & 0 \\ 1 & 0 \\ 1 & 1 \\ 1 & 1 \\ 0 & 1 \\ 1 & 0 \\ 1 & 1 \\ 0 & 1 \\ 1 & 0 \\ 0 & 1 \end{vmatrix}$$

$[1,1,x_3,x_4,x_5,x_6,x_7,x_8,x_9,x_{10}]A^{11}[2]=[1,1]$ $x_3+x_4+x_6+x_7+x_9=0$ $x_3+x_4+x_5+x_7+x_8+x_{10}=1$

The next relative time of arrival of a key frequency transmission is in time interval 12, leading to the following transition matrix $A^{12}$ and two further equations:

$$A^{12} = \begin{vmatrix} 0 & 1 \\ 0 & 1 \\ 1 & 1 \\ 1 & 1 \\ 1 & 0 \\ 0 & 0 \\ 1 & 0 \\ 1 & 0 \\ 0 & 1 \\ 1 & 0 \end{vmatrix}$$

$[1,1,x_3,x_4,x_5,x_6,x_7,x_8,x_9,x_{10}]A^{12}[2]=[1,1]$ $x_3+x_4+x_6+x_7+x_9=0$ $x_3+x_4+x_9=1$

The result of the foregoing steps is a set of equations; in the instant example, the equations are as follows:

$x_5=1$ $x_6=1$ $x_8=1$ $x_9=1$ $x_9=1$ $x_{10}=1$ $x_{10}=1$ $x_3+x_5+x_6+x_8=1$ $x_3+x_4+x_6+x_7+x_9=0$ $x_3+x_4+x_5+x_7+x_8+x_{10}=1$ $x_3+x_4+x_6+x_7+x_9=0$ $x_3+x_4+x_9=1$

In certain embodiments, it may be advantageous to store in computer memory in the receiver 300 the transition matrices (or the needed columns/portions thereof) that are to be used in developing the equations in accordance with steps 618 and 622 of the method 600 of FIG. 6. The number of transition matrices to be stored depends upon the maximum length of time needed for enough key frequency receptions to occur by which it would be guaranteed that the initial transmitter codeword could be determined.

When a sufficient number of equations have been obtained (i.e., when the number of equations exceeds the number of unknowns), the initial binary codeword in the transmitter feedback shift register 410 may be determined. Thus, in a next step 630 in the method 600 shown in FIG. 6, the system of equations is solved. A variety of conventional computer-assisted and/or mathematical algorithms exist for arriving at a solution for a set of unknowns from a set of equations. Generally, such algorithms may involve placing N equations with N unknowns in a matrix, thus setting up an equation in the form Ax=c, where x is a vector representing the initial transmitter codeword, and c is a vector of constant values. The matrix may then be reduced to diagonal form using conventional mathematical techniques, and the matrix inverted in order to solve for the initial transmitter codeword x. For example, the solution to the system of equations listed previously is as follows:

$[1,1,x_3,x_4,x_5,x_6,x_7,x_8,x_9,x_{10}]=[1,1,0,0,1,1,0,1,1,1]$

Thus, [1,1,0,0,1,1,0,1,1,1] is the state of the transmitter feedback shift register 410 when the first occurrence of the key frequency (i.e., frequency "d") is being generated—i.e., the "initial state" of the transmitter feedback shift register as perceived by the receiver.

In the example of FIGS. 4 and 5, two equations are derived with each reception of a key frequency transmission, because two bits are used to select which of the available four frequencies will be transmitted by the frequency hopping code sequence generator 400. More generally, given y bits for selecting from among the various available transmission frequencies (i.e., the number of bits in frequency select signal), then y equations will be obtained with each reception of a key frequency. In the example of FIG. 4, the number of bits in the frequency select signal 412 is two, and so each reception of a signal transmitted at the key frequency will yield two new equations at the receiver 300. If the frequency hopping code sequence generator 400 hopped over, for example, a thousand frequencies instead of four, the receiver 300 could obtain up to ten equations with each received occurrence of the key frequency, rather than just two equations. As but one example, the transmitter feedback shift register may have 100 stages, with seven feedback taps (providing up to 128 hopping frequencies for selection). In such a case, seven equations would be obtained from each occurrence of a key frequency transmission. After 15 "hits" of the key frequency, a total of 105 equations would be obtained, which is more than the number of stages which need to be solved for the transmitter feedback shift register. Thus, only 15 key frequency transmissions would be needed to solve for the contents of the transmitter feedback shift register.

It may be noted that a missed key frequency transmission will not necessarily cause a failure of the synchronization algorithm. However, it may require waiting for an additional key frequency transmission to make up for the lost information.

Figure 14:
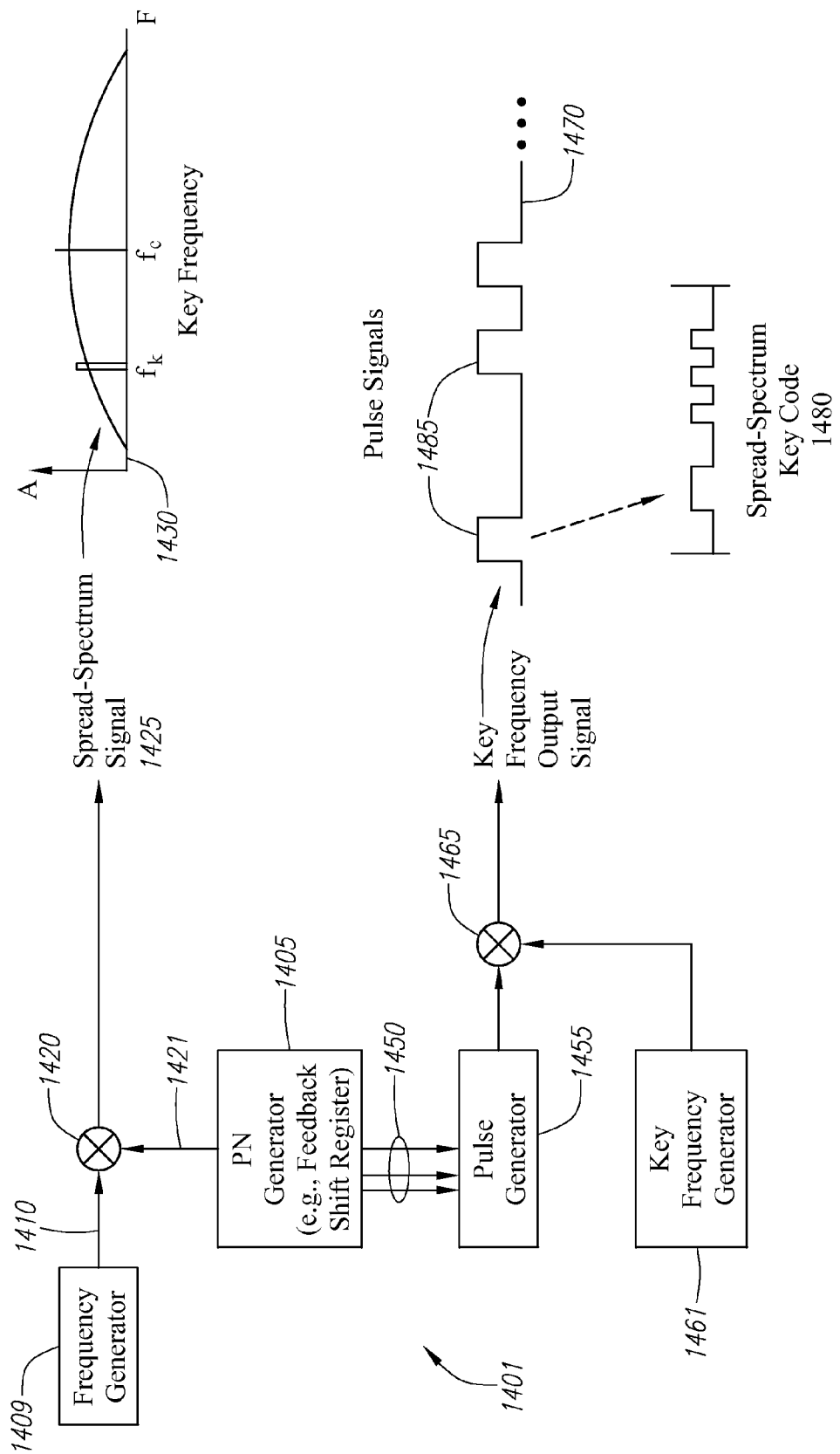
FIG. 14 is a diagram of a direct sequence spread spectrum transmitter that transmits pulse signals on a key frequency for detection by a receiver.

While the method 600 of FIG. 6 has been described with reference to an example in which frequency hopping spread spectrum communication is utilized, it will be appreciated that the same principles are applicable to direct sequence spread spectrum communication. An example of one embodiment for use in a direct sequence spread spectrum system is illustrated in FIG. 14. As shown therein, a spread spectrum transmitter 1401 comprises a pseudo-noise (PN) generator 1405 which may be implemented as, e.g., a feedback shift register as previously described herein. A single tap output 1421 from the PN generator 1405 is input to modulator 1420 (e.g., a multiplier), which multiplies the spreading code output from the PN generator 1405 with a carrier signal 1410 output from a frequency generator 1409, to generate a spread spectrum signal 1425 (which may be further modulated with a data signal). The frequency domain characteristics of the spread spectrum signal 1425 are illustrated in the accompanying graph 1430.

In FIG. 14, a set of one or more taps 1450 is also taken from the PN generator 1405 and connected to a pulse generator 1455. Whenever a desired bit sequence (e.g., "111") on the set of taps 1450 occurs, the pulse generator 1455 outputs a pulse signal 1485, which preferably takes the form of a spread spectrum code 1480, which may be a fixed or predetermined spread spectrum code. This spread spectrum encoded pulse signal 1485 is preferably of sufficient length so as to provide enough processing gain to allow the receiver to distinguish the encoded pulse signal 1485 from noise or other interfering sources. Each pulse signal 1485 is modulated by a carrier signal 1460 at a desired key frequency. The carrier signal 1460 may be output from a programmable oscillator 1461, to allow the transmitter 1401 to readily change the key frequency. An example of an output signal from multiplier 1465, in the time domain, is illustrated by graph 1470 in FIG. 14.

The receiver may be configured in a manner similar to that shown in FIG. 3 and described earlier herein. The receiver preferably includes a correlator for despreading the spread spectrum code on the key frequency and an envelope detector for detecting the received signal after it has been despread. Each time the spread spectrum code is recognized, the correlator outputs a correlation pulse. Many conventional types of spread spectrum correlators are known in the art. The receiver detects the relative times of arrival of the pulse signals, and applies the same algorithms as previously described herein to re-construct the initial transmitter codeword from knowledge of the relative times of arrival, as well as the transmitter feedback shift register configuration (i.e., size and location of taps), and the bit sequence (e.g., "111") needed to cause the transmitter to generate the pulse signal each time.

A similar technique may be applied to a frequency hopping system in which the hopping rate is faster than the data rate (for example, 20 hops per data bit). In order to allow rapid synchronization, in one embodiment, a spread spectrum code is transmitted each frequency hop, rather than simply a brief hop. This spread spectrum code is preferably of sufficient length to provide the desired processing gain. At the receiver, a spread spectrum correlator is used to generate a correlation pulse each time a pulse signal is received. The receiver then measure the relative times of arrival of the key frequency pulse signal, as described before.

It may be seen that the method 600 set forth in FIG. 6 provides a useful and relatively rapid technique for a receiver 300 to derive the initial contents of the transmitter feedback shift register 410. The synchronization algorithm 320 determines the codeword initially in the transmitter feedback shift register 410 at the time the first instance of the key frequency was transmitted. However, the synchronization algorithm 320 generally utilizes a series of received key frequency transmissions over time to determine the contents of the transmitter feedback shift register, and as the subsequent key frequency transmissions are received, the transmitter will have progressed in its code sequence past the initially detected state of the transmitter feedback shift register 410. Moreover, the synchronization algorithm may take one or possibly more clock intervals to make its initial codeword determination, leading to further drift between the transmitter and the receiver as the transmitter feedback shift register 410 continues to output the code sequence. In order to synchronize the receiver 300 with the transmitter, the receiver 300 determines the current binary codeword that resides in the transmitter feedback shift register 410. The receiver 300 may make such a determination because the counter 316 continuously counts the number of clock pulses after the initial key frequency transmission was received (having been preferably reset upon the occurrence of the first detected key frequency transmission). With the knowledge of the time elapsed since receipt of the first key frequency transmission, and with the knowledge of the contents of the transmitter feedback shift register 410 at the time of receipt of the initial key frequency transmission, the receiver 300 may determine the current binary codeword in the transmitter feedback shift register 410 in a variety of different ways. The receiver 300 is preferably brought into synchronization with the transmitter by rapidly advancing from the initial codeword to the current state of the transmitter feedback shift register 410. This advancement can be accomplished in a variety of ways.

As one approach to synchronizing the receiver feedback shift register 340 with the transmitter feedback shift register 410, the receiver 300 may simply load the initial codeword that was determined by the synchronization algorithm 320 into the receiver feedback shift register 340, and then apply clocking signals to the receiver feedback shift register 340 at an accelerated rate based upon the number of counts in the counter 316, until the receiver feedback shift register 340 is caught up with the transmitter feedback shift register 410. Preferably, the clocking signals are applied to the receiver feedback shift register 340 at such a rate that the advancement of the receiver feedback shift register 340 is completed within a single code clock interval.

Alternatively, and in a preferred embodiment, a binary operation is performed on the initial codeword to rapidly advance it to the current state of the codeword in the transmitter feedback shift register 410, and to thereby synchronize the receiver feedback shift register 340 with the transmitter feedback shift register 410. This rapid time advancement is accomplished by modulo-two adding selected code elements of the initial binary codeword in various combinations to arrive at a new (i.e., the current) binary codeword. The specifics of the binary operation depend upon the particular configuration (i.e., tap locations) of the tapped shift register and the amount of time advancement that is needed.

A preferred method for time advancement of the receiver feedback shift register 340 may be explained with reference to the flow diagram of FIG. 7. As illustrated therein, a method 700 for time advancement of the receiver feedback shift register comprises a first step 703 of initializing a modular feedback shift register 323 corresponding to the receiver feedback shift register 340. A modular feedback shift register is a shift register configuration that is functionally equivalent to a tapped feedback shift register, but instead is connected in a "modular" fashion with modulo-2 adders between the delay stages of the shift register, as opposed to a single modulo-2 adder that combines all of the tapped outputs into a feedback signal. An example of a modular feedback shift register 800 corresponding to the feedback shift register 410 shown in FIG. 4 is illustrated in FIG. 8. As shown therein, the modular feedback shift register 800 comprises a plurality of delay stages 805, with modulo-2 adders 809 interposed between selected delay stages 805. A feedback signal 815 from the last delay stage 805 connects as an input to each of the modulo-2 adders 809, and to the first delay stage 805. The positioning of the modulo-2 adders 809 is related to the configuration of the tapped shift register 407 to which the modular feedback shift register 800 corresponds. More specifically, the modulo-2 adders 809 are located before each delay stage 805 which is tapped in the tapped shift register 407 (with the exception of the first delay stage 805, which directly receives the feedback signal 815). Thus, in the example illustrated in FIG. 8, modulo-2 adders 809 are located before the second, third, fifth, sixth and eighth delay stages 805. Obtaining a modular feedback shift register 800 from a tapped feedback shift register can therefore be accomplished in a straightforward manner.

Figure 7:
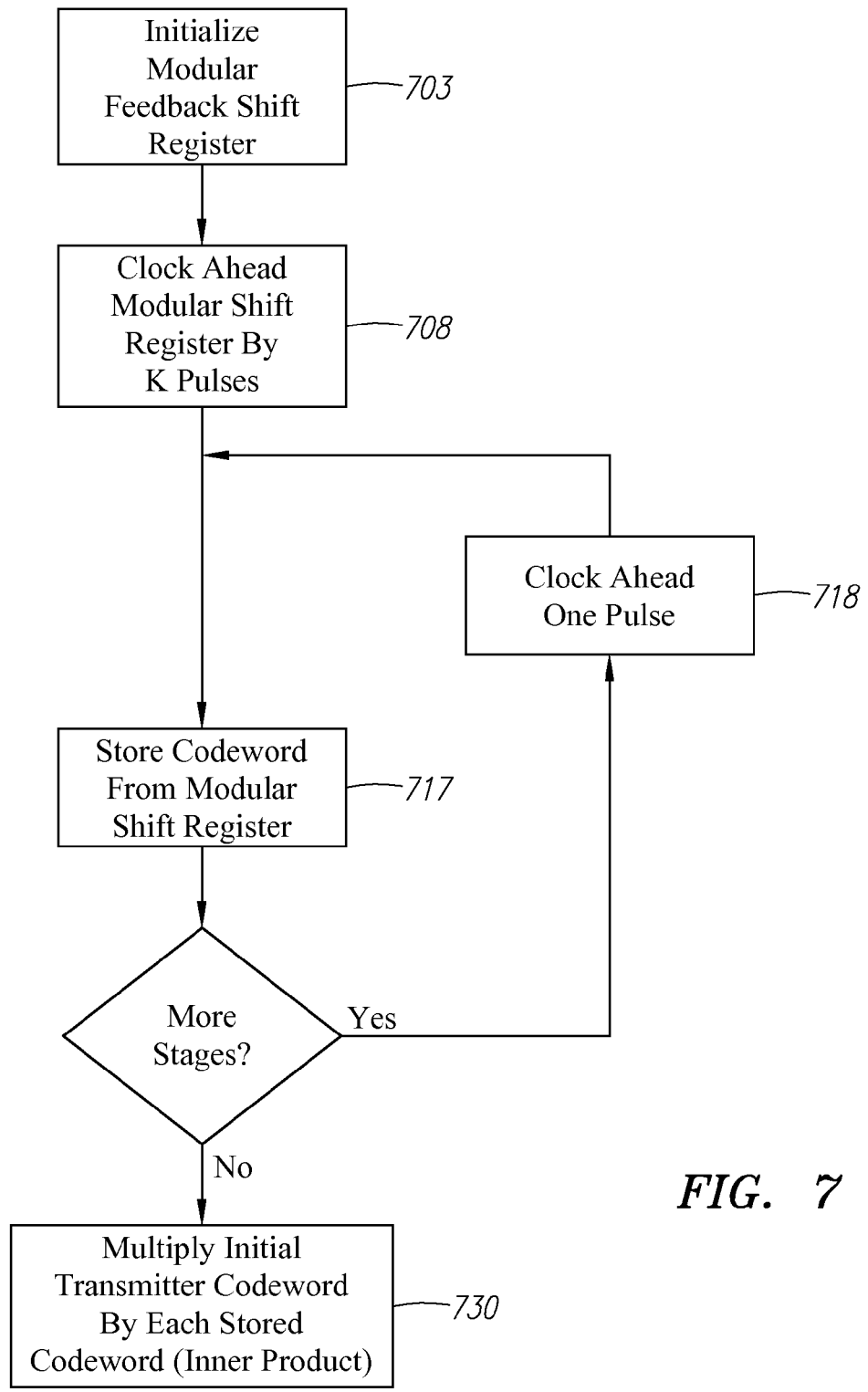
FIG. 7 is a process flow diagram of a method for time advancing the initial transmitter codeword to compensate for lag between the transmitter and receiver.
Figure 8:
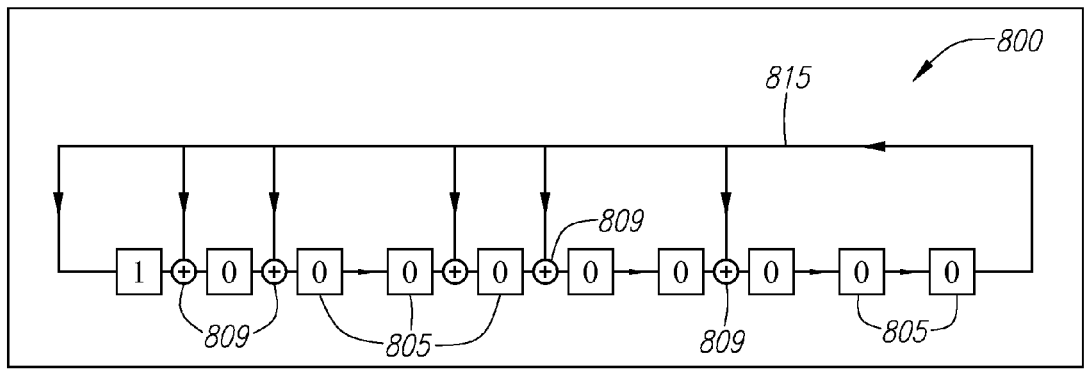
FIG. 8 is a diagram of an example of a modular feedback shift register.

Returning back to step 703 of the method 700 of FIG. 7, the modular feedback shift register 323 is initialized by loading a codeword [1, 0, 0, . . . 0] into it. In a next step 708, the modular feedback shift register 323 is clocked ahead by a number of clock pulses k equal to the measured time difference (i.e., time lag) between the receiver and the transmitter. Thus, if 12 clock pulses have elapsed from receipt of the first key frequency transmission (as measured by, e.g., the counter 316 in the receiver 300), the modular feedback shift register 323 is clocked ahead by 12 clock pulses. Then, in next steps 717 and 718, the modular feedback shift register 323 is clocked once for each additional delay stage 408 in the transmitter feedback shift register 410 beyond the first delay stage 408, and the codeword at each clock pulse is recorded, for a total of N codewords. For example, with the modular feedback shift register 800 in FIG. 8, after being advanced by k clock pulses, the modular feedback shift register 800 would be clocked an additional nine times, once for each additional delay stage 408 of the transmitter feedback shift register 410 beyond the first delay stage 408, and the ten resulting codewords at each clock pulse would be stored for further use.

In the example of FIG. 8, the successive binary words of the modular feedback shift register 800 would be as follows:

| | |
|---|---|
| 0 | 1000000000 |
| 1 | 0100000000 |
| 2 | 0010000000 |
| 3 | 0001000000 |
| 4 | 0000100000 |
| 5 | 0000010000 |
| 6 | 0000001000 |
| 7 | 0000000100 |
| 8 | 0000000010 |
| 9 | 0000000001 |
| 10 | 1110110100 |
| 11 | 0111011010 |
| 12 | 0011101101 |
| 13 | 1111000010 |
| 14 | 0111100001 |
| etc. | ... |

Assuming once again that 12 clock pulses separated the transmitter and receiver, the first codeword stored would be "0011101101", the second codeword stored would be "11110000100", and so on.

Figure 9:
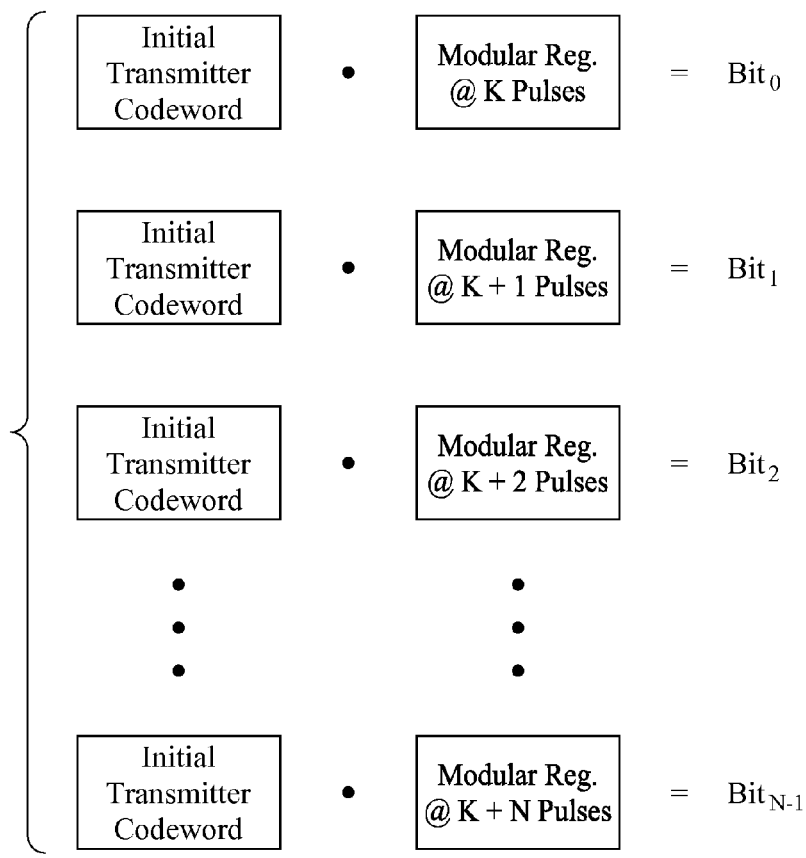
FIG. 9 is a diagram illustrating a set of inner product calculations to perform rapid time advancement of a given code.

The N stored codewords define a set of inner product equations by which the current contents of the transmitter feedback shift register 210 can be derived. Thus, in a next step 730, the initial codeword that had been determined by the receiver 300 for the transmitter feedback shift register 410 is multiplied (using inner product multiplication) to arrive at the individual bits (i.e., code elements) of the current codeword of the transmitter feedback shift register 210. This series of operations is shown graphically in FIG. 9. The inner product (also referred to as "dot" product) is obtained according to the following operation:

$$[a_0 a_1 a_2 \ldots] \cdot [b_0 b_1 b_2 \ldots] = a_0 b_0 + a_1 b_1 + a_2 b_2 +$$

where all operations are carried out using modulo-2 arithmetic. The final result of each dot product is a "1" or "0" binary value.

Figure 10:
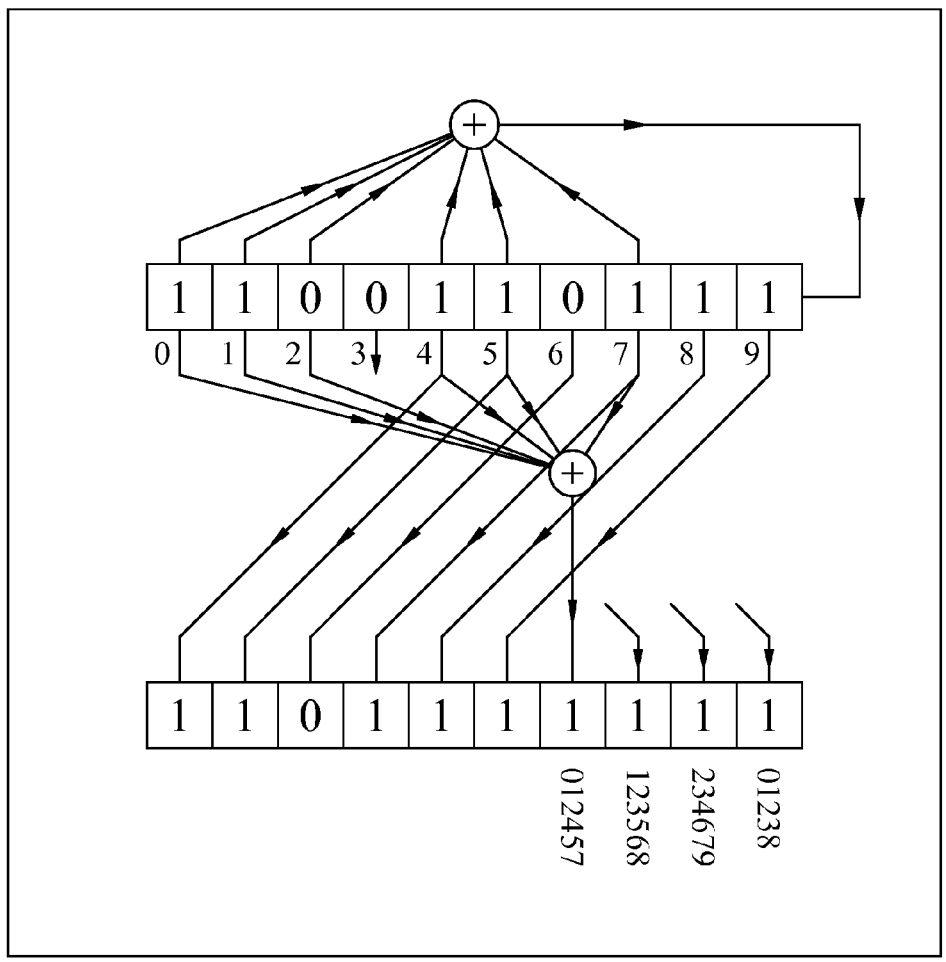
FIG. 10 is a hardware diagram illustrating one configuration for performing inner product calculations to perform rapid time advancement of a given code.

FIG. 10 diagrammatically illustrates an example of operations that would be used to advance the ten-stage feedback shift register 410 shown in FIG. 4, loaded with the initial transmitter codeword (as determined by the receiver 300) by four clock pulses. In FIG. 10 (in which the delay stages are numbered stage-0 through stage-9), stage-4 feeds directly into stage-0 of the final codeword because the 4$^{th}$ codeword "0000100000" of the sequentially advanced modular shift register 800 indicates that only stage-4 of the initial transmitter codeword contributes to stage-0 of what will become the current codeword for the receiver 300. Similarly, stage-5 feeds directly into stage-1 of the final codeword because the 5$^{th}$ codeword "0000010000" of the sequentially advanced modular shift register 800 indicates that only stage-5 of the initial transmitter codeword contributes to stage-1 of what will become the current codeword for the receiver 300. Similar direct connections are made from stage-6, stage-7, stage-8 and stage-9 of the initial transmitter codeword, to stage-2, stage-3, stage-4 and stage-5, respectively, of what will become the current codeword for the receiver 300.

However, stage-6 of what will become the current codeword for the receiver 300 is derived from the contents of stage-0, stage-1, stage-2, stage-4, stage-5 and stage-7 of the initial transmitter codeword, according to the 10$^{th}$ codeword "1110110100" of the sequentially advanced modular shift register 800. Likewise, stage-7, stage-8 and stage-9 of what will become the current codeword in the receiver 300 are each derived from the contents of multiple stages in the initial transmitter codeword, according to codewords 11, 12, 13 and 14 of the sequentially advanced modular shift register 800.

In implementation, the modular feedback shift register 800 can take the form of a register or set of memory locations of a processor or processor-based circuitry that resides in the receiver 300. For example, the modular feedback shift register 800 may be implemented as a predefined variable in a software program that executes, among other things, the synchronization algorithm 320. In such a case, the processor may be programmed through software code to perform steps to time-advance the modular feedback shift register 800 by, e.g., initializing the modular feedback shift register variable, and then consecutively performing a binary operation on the modular feedback shift register a number of times necessary to obtain the ten codewords following the $k^{th}$ codeword (assuming ten delay stages in the receiver feedback shift register—more generally, the algorithm obtains the N codewords following the $k^{th}$ codeword). The processor then performs N inner product multiplications, as previously described with respect to the method 700 of FIG. 7, between the determined initial transmitter codeword and each of the N codewords following the $k^{th}$ codeword that were obtained from the modular feedback shift register 800. The N inner product results are stored sequentially as the N bits (i.e., code elements) of the current codeword. The processor then may transfer the current codeword into the receiver feedback shift register 340, and the receiver 300 will thereafter operate in synchronization with the transmitter.

Figure 11:
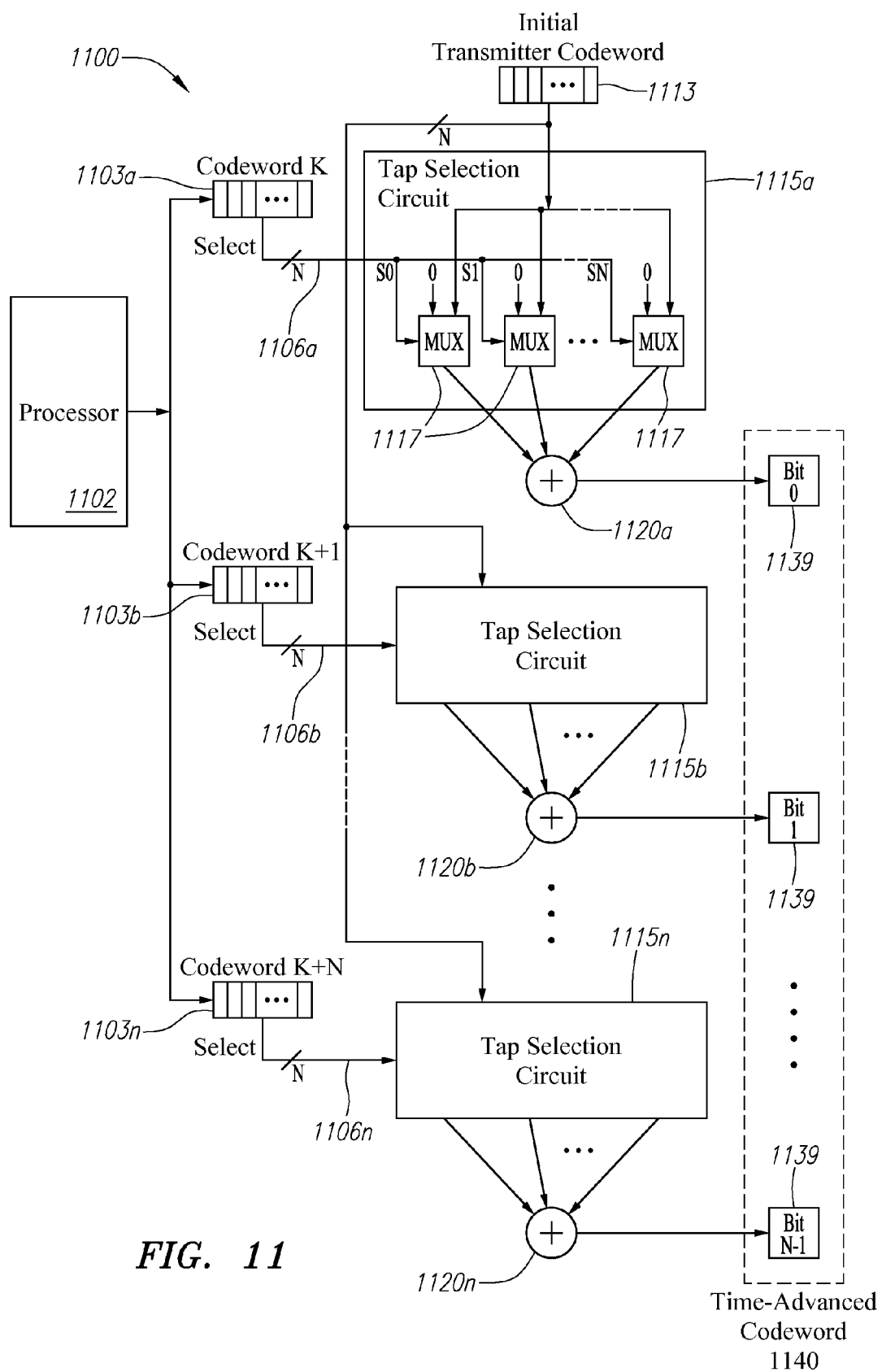
FIG. 11 is a hardware diagram illustrating another embodiment of a circuit for performing rapid time advancement of a given code.

Alternatively, hardware registers can be used to assist in rapidly deriving a plurality of inner products. Such a configuration is illustrated in FIG. 11. As shown therein, the N codewords can be used to select which code elements from the initial codeword 1113 contribute to which bits (i.e., code elements) 1139 of what will become the current codeword in the receiver. The N codewords can be determined by a software routine run by a processor 1102, or by, e.g., a finite state machine or other similar hardware, according to the steps previously described herein. The N codewords can be loaded by the processor 1102 (or other such control circuitry) into individual codeword registers 1103a-1103n. Each bit of a codeword loaded into one of the codeword registers 1103a-1103n functions as a select signal for a multiplexer or other such selector, which either selects the corresponding code element from the initial transmitter codeword 1113 or else selects a "0" value to contribute to the bit value calculation. Each bit 1139 is formed from the calculation of the inner product of the bits in the initial transmitter codeword 1113 and the bits of the corresponding codeword register 1103, as implemented by, e.g., the circuitry shown in FIG. 11. The circuit 1100 illustrated in FIG. 11 thus rapidly, and in parallel, determines all of the inner products to arrive at the time-advanced codeword 1140 that will be fed into the receiver feedback shift register. Alternatively, a single codeword register 1103 and single tap selection circuit 1115 may be used, and the N codewords loaded one-by-one into the single codeword register 1103 to separately determine each bit value of the time-advanced codeword.

Utilizing various of the aforementioned techniques, a receiver not presently in communication with a transmitter can remain dormant until detecting a recognizable series of transmissions that appear on the key frequency that is monitored by the receiver. When the receiver is first activated, it starts monitoring the key frequency. With the first detected transmission on the key frequency, the receiver attempts to establish synchronization. The receiver accumulates information about the relative times of arrival of key frequency transmissions, and from this information determines the initial contents of the transmitter feedback shift register. The receiver then advances its own feedback shift register to match the current stage of the transmitter feedback shift register, and thereafter communicates in synchronization with the transmitter.

On the chance that interference causes the receiver to misinterpret an errant signal (due to noise and/or interference) as an occurrence of the initial key frequency transmission, then synchronization may be unsuccessful in the first instance, and this fact can be discovered either by the receiver being unable to solve the set of linear equations, or else by loading an incorrect codeword in the receiver shift register and recognizing the synchronization has not occurred because the data is not properly detectable. The receiver can then attempt to synchronize again.

Figure 12:
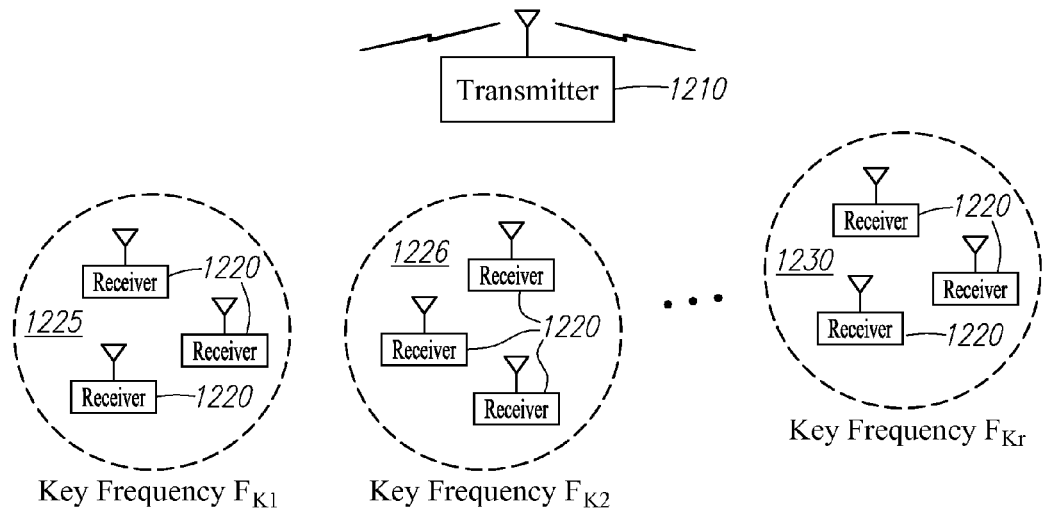
FIG. 12 is a top-level diagram of a multi-receiver system in which key frequencies can be used to selectively address groups of receivers.
Figure 13:
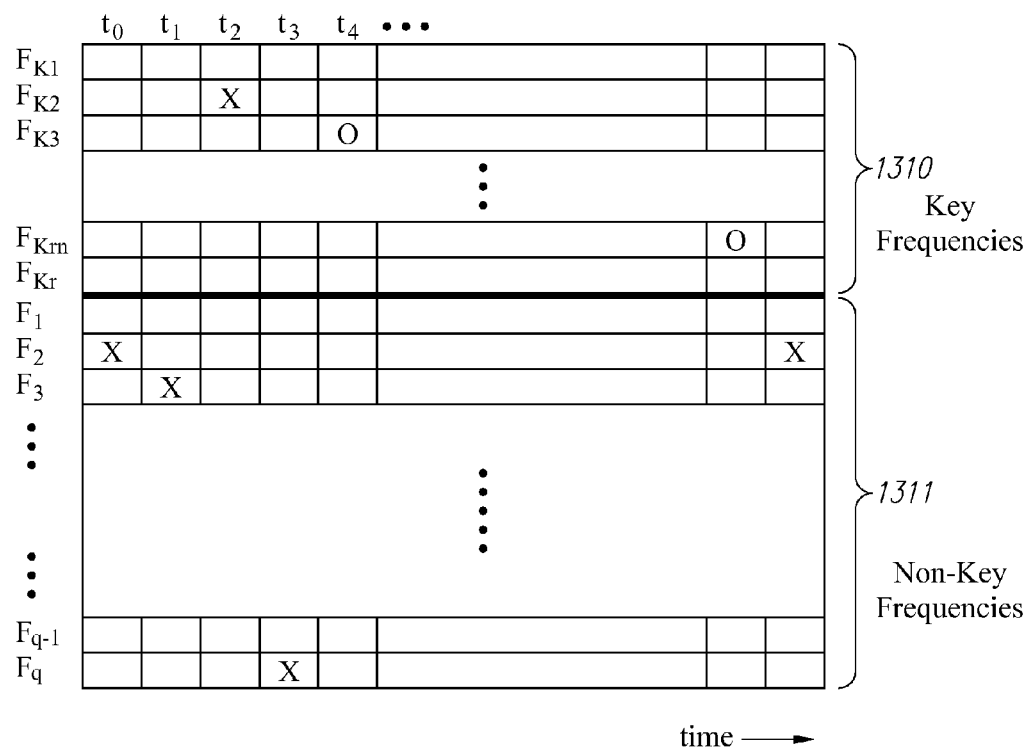
FIG. 13 is a diagram of an example of a spectrum division for key frequencies and non-key frequencies.

The use of a single "selected" or key frequency as a monitoring frequency to establish initial synchronization may be advantageously employed in a multi-receiver system, to allow selective addressing of specified receivers when broadcasting signals over a region. FIG. 12 illustrates a multi-receiver system 1200 in which the receivers 1220 are "grouped" according to their "key" frequency—that is, the frequency which each receiver 1220 monitors in order to determine whether it should listen to whatever message is being broadcast by a particular transmitter 1210. FIG. 13 illustrates one possible division of frequencies into a key frequency spectrum 1310 and a non-key frequency spectrum 1311, as well as a hopping pattern relating thereto. While the key frequency spectrum 1310 and non-key frequency spectrum 1311 are each shown as contiguous and distinct in FIG. 13, they need not be, and, for example, could be non-contiguous and/or interleaved with one another. The non-key frequency spectrum 1311 is divided into a plurality of non-key frequencies $F_0, F_1, \ldots F_q$ (a total of q frequencies), which are used for frequency hopping of data. The key frequency spectrum 1310 is divided into a plurality of key frequencies $F_{K1}, F_{K2}, \ldots F_{Kr}$ (a total of r frequencies), which are assigned to receivers 1220 as key frequencies, and are selectively utilized in the frequency hopping pattern only when attempting to communicate with the corresponding receivers 1220.

Returning now to FIG. 12, operation according to one embodiment may be illustrated as follows. Suppose the transmitter 1210 desires to communicate only with those receivers 1220 which are assigned either key frequency $F_{K1}$ (receiver group 1225) or key frequency $F_{K2}$ (receiver group 1226). The transmitter 1210 generates a frequency hopping pattern that, before receiver selection processing, includes all of the frequencies in the non-key frequency band 1311 and all of the frequencies in the key frequency band 1310. However, if it is desired that the transmitter 1210 exclude any groups of receivers 1220, then the transmitter 1210 does not transmit on the key frequencies assigned to the receiver groups to be excluded. In the instant example, the transmitter 1210 would not transmit on any of key frequencies $F_{K3}$ through $F_{Kr}$. Instead, when the frequency hopping pattern calls for a transmission on any of the excluded key frequencies $F_{K3}$ through $F_{Kr}$, the transmitter 1210 may simply no transmit (i.e., leave a "hole"), as illustrated by the example in time interval $t_4$ of FIG. 13, or else may transmit on any of a parallel set of unused frequencies, or else may transmit on a non-key frequency.

If a receiver 1220 fails to receive a transmission on its key frequency, then the receiver 1220 has no way to synchronize, and it will be effectively excluded from receiving the transmitter's signal. Accordingly, the foregoing provides a technique for selectively excluding receivers from receiving a broadcast transmission from a transmitter 1210.

While preferred embodiments of the invention have been described herein, many variations are possible which remain within the concept and scope of the invention. Such variations would become clear to one of ordinary skill in the art after inspection of the specification and the drawings. For example, certain embodiments may be used to synchronize two or more systems where any observable parameter of the system is being pseudo-randomly varied. This synchronization would be achieved by measuring the relative time between recurrences of a selected value of the parameter being varied. The invention therefore is not to be restricted except within the spirit and scope of any appended claims.

What is claimed is:

1. A method for wireless communication, comprising the steps of:
   transmitting a series of transmissions at a predetermined frequency, said transmissions separated by one or more clock intervals pseudo-randomly determined according to an initial code word loaded into a transmitter feedback shift register;
   receiving said series of transmissions at a receiver;
   at said receiver, measuring relative times of arrival between consecutive ones of said transmissions;
   determining said initial code word in the transmitter feedback shift register from the measured relative times of arrival between the consecutive transmissions;
   matching a receiver feedback shift register to the initial code word, adjusted by an amount of time since receiving the first one of said consecutive transmissions; and
   using said receiver feedback shift register to carry out synchronized communication with the transmitter.

2. The method of claim 1, further comprising the step of transmitting, over a plurality of different frequencies including said predetermined frequency, a series of frequency hopping transmissions during a plurality of frequency hopping intervals, and wherein said step of using said receiver feedback shift register to carry out synchronized communication with the transmitter comprises the step of despreading said frequency hopping transmissions to recover a data signal.

3. The method of claim 1, wherein said step of matching said feedback receiver shift register to the initial code word comprises the steps of
   constructing a plurality of relationships between transition matrices, a set of unknown initial states of the transmitter feedback shift register, and information represented by each transition;
   deriving a plurality of linear equations from said relationships; and
   solving said plurality of linear equations for said set of unknown initial states when the number of linear equations exceeds the number of unknown initial states of the transmitter feedback shift register, thereby yielding the initial states of said transmitter feedback shift register.

4. The method of claim 3, wherein each of said transmissions is generated upon the occurrence of a predetermined set of code values in q designated stages of the transmitter feedback shift register, said transmitter feedback shift register having n total stages, and wherein said step of constructing said plurality of relationships comprises the steps of
   (a) assigning, to said q designated stages in the transmitter feedback shift register, said predetermined set of code values upon receipt of a first one of said transmissions;
   (b) calculating a number of intervening clock pulses until the next consecutive transmission received at the receiver;
   (c) obtaining a time-advanced transition matrix $A^p$ for the current received transmission, wherein an amount of time advancement is based upon a number of intervening clock pulses p between the occurrence of the first one of said transmissions and the occurrence of the current received transmission;
   (d) deriving a linear equation according to the form $x \cdot A^p[q] = y$, wherein x represents a linear vector having a number of elements equal to the number of stages n in said transmitter feedback shift register, said linear vector comprising said predetermined set of code values at locations in said linear vector corresponding to the q designated stages in said transmitter feedback shift register and a set of n-q unknowns at locations in said linear vector corresponding to all other locations in said transmitter feedback shift register, wherein $A^p[q]$ represents a portion of a transition matrix A raised to a power equal to the number of intervening clock pulses p, said portion being those q columns in transition matrix $A^p$ which are associated with said q designated stages in the transmitter feedback shift register, and wherein y represents a linear vector having a number of elements equal to the number of said q designated stages, said elements of y being assigned said predetermined set of code values; and
   (e) repeating steps (b) through (d) until a sufficient number of said linear equations are derived to allow said set of unknown initial states to be solved.

5. The method of claim 3, wherein the adjustment of said feedback shift register by said amount of time since the first transmission utilized in said step of measuring relative times of arrival between consecutive transmissions comprises the step of clocking said receiver feedback shift register at an accelerated rate until it matches the transmitter feedback shift register.

6. The method of claim 3, wherein the adjustment of said feedback shift register by said amount of time since the first transmission utilized in said step of measuring relative times of arrival between consecutive transmissions comprises the step of deriving a time-advanced feedback shift register code word by obtaining a plurality of vector dot products between the initial transmitter code word and a plurality of modular feedback shift register code words, said modular feedback shift register code words derived by:
   initializing a modular feedback shift register corresponding to the transmitter feedback shift register;
   advancing the modular feedback shift register ahead by the number of clock intervals elapsed since the receipt of said first one of said consecutive transmissions, thereby obtaining a first modular feedback shift register code word from the contents of said modular feedback shift register; and
   incrementing the modular feedback shift register once for each additional bit needed for the transmitter feedback shift register, thereby obtaining successive modular feedback shift register code words from the contents of said modular feedback shift register at each increment.

7. The method of claim 6, wherein said step of obtaining a plurality of vector dot products between the initial transmitter code word and a plurality of modular feedback shift register code words comprises the step of modulo-two combining one or more selected elements of the initial transmitter code word together to form each bit of the time-advanced feedback shift register code word, the one or more selected elements of the initial transmitter code word being combined together based upon the code values of said plurality of modular feedback shift register code words.

8. The method of claim 1, further comprising the steps of
transmitting a second series of transmissions at a second predetermined frequency, said transmissions in said second series separated by one or more clock intervals pseudo-randomly determined according to said initial code word loaded into the transmitter feedback shift register;
receiving said second series of transmissions at a second receiver;
at said second receiver, measuring relative times of arrival between consecutive ones of said transmissions in said second series;
determining, at said second receiver, said initial code word in the transmitter feedback shift register from the measured relative times of arrival between the consecutive transmissions in said second series;
matching, at said second receiver, a second receiver feedback shift register to the initial code word, adjusted by an amount of time since receiving the first one of said consecutive transmissions in said second series; and
using said second receiver feedback shift register to carry out synchronized communication with the transmitter and said second receiver.

9. The method of claim 1, wherein each of said transmissions comprises a spread spectrum code, and wherein said step of receiving said series of transmissions at said receiver comprises the step of correlating each of said transmissions using a correlator, said correlator outputting a correlation pulse when each transmission is received, said method further comprising the step of using the correlation pulse to indicate arrival of one of said transmissions.

10. In a frequency hopping spread spectrum communication system, wherein a frequency hopping transmitter transmits in a pseudo-random manner across a plurality of frequencies including a key frequency, the transmissions over said key frequency being separated by one or more clock intervals pseudo-randomly determined according to an initial code word loaded into a transmitter feedback shift register, a method of reception comprising the steps of:
monitoring the key frequency for a series of transmissions by said frequency hopping transmitter;
measuring relative times of arrival between consecutive ones of said transmissions;
determining said initial code word in the transmitter feedback shift register from the measured relative times of arrival between the consecutive transmissions;
matching a receiver feedback shift register to the initial code word, adjusted by an amount of time since receiving the first one of said consecutive transmissions, thereby synchronizing said receiver feedback shift register to the transmitter feedback shift register; and
using said receiver feedback shift register to despread the transmissions of the frequency hopping transmitter over said plurality of frequencies.

11. The method of claim 10, wherein said step of matching said feedback receiver shift register to the initial code word comprises the steps of
constructing a plurality of relationships between transition matrices, a set of unknown initial states of the transmitter feedback shift register, and information represented by each transition;
deriving a plurality of linear equations from said relationships; and
solving said plurality of linear equations for said set of unknown initial states when the number of linear equations exceeds the number of unknown initial states of the transmitter feedback shift register, thereby yielding the initial states of said transmitter feedback shift register.

12. The method of claim 11, wherein each of said transmissions is generated upon the occurrence of a predetermined set of code values in q designated stages of the transmitter feedback shift register, said transmitter feedback shift register having n total stages, and wherein said step of constructing said plurality of relationships comprises the steps of
(a) assigning, to said q designated stages in the transmitter feedback shift register, said predetermined set of code values upon receipt of a first one of said transmissions;
(b) calculating a number of intervening clock pulses until the next consecutive transmission received at the receiver;
(c) obtaining a time-advanced transition matrix $A^p$ for the current received transmission, wherein an amount of time advancement is based upon a number of intervening clock pulses p between the occurrence of the first one of said transmissions and the occurrence of the current received transmission;
(d) deriving a linear equation according to the form $x \cdot A^p[q]=y$, wherein x represents a linear vector having a number of elements equal to the number of stages n in said transmitter feedback shift register, said linear vector comprising said predetermined set of code values at locations in said linear vector corresponding to the q designated stages in said transmitter feedback shift register and a set of n-q unknowns at locations in said linear vector corresponding to all other locations in said transmitter feedback shift register, wherein $A^p[q]$ represents a portion of a transition matrix A raised to a power equal to the number of intervening clock pulses p, said portion being those q columns in transition matrix $A^p$ which are associated with said q designated stages in the transmitter feedback shift register, and wherein y represents a linear vector having a number of elements equal to the number of said q designated stages, said elements of y being assigned said predetermined set of code values; and
(e) repeating steps (b) through (d) until a sufficient number of said linear equations are derived to allow said set of unknown initial states to be solved.

13. The method of claim 10, wherein the adjustment of said feedback shift register by said amount of time since the first transmission utilized in said step of measuring relative times of arrival between consecutive transmissions comprises the step of clocking said receiver feedback shift register at an accelerated rate until it matches the transmitter feedback shift register.

14. The method of claim 10, wherein the adjustment of said feedback shift register by said amount of time since the first transmission utilized in said step of measuring relative times of arrival between consecutive transmissions comprises the step of deriving a time-advanced feedback shift register code word by obtaining a plurality of vector dot products between the initial transmitter code word and a plurality of modular feedback shift register code words, said modular feedback shift register code words derived by:

initializing a modular feedback shift register corresponding to the transmitter feedback shift register;

advancing the modular feedback shift register ahead by the number of clock intervals elapsed since the receipt of said first one of said consecutive transmissions, thereby obtaining a first modular feedback shift register code word from the contents of said modular feedback shift register; and incrementing the modular feedback shift register once for each additional bit needed for the transmitter feedback shift register, thereby obtaining successive modular feedback shift register code words from the contents of said modular feedback shift register at each increment.

15. In a direct sequence spread spectrum communication system, wherein a direct sequence spread spectrum transmitter transmits in a pseudo-random manner over a predetermined frequency, the transmissions over said predetermined frequency being separated by one or more clock intervals pseudo-randomly determined according to an initial code word loaded into a transmitter feedback shift register, a method of reception comprising the steps of:

monitoring the predetermined frequency for a series of transmissions by said direct sequence spread spectrum transmitter;

measuring relative times of arrival between consecutive ones of said transmissions;

determining said initial code word in the transmitter feedback shift register from the measured relative times of arrival between the consecutive transmissions;

matching a receiver feedback shift register to the initial code word, adjusted by an amount of time since receiving the first one of said consecutive transmissions, thereby synchronizing said receiver feedback shift register to the transmitter feedback shift register; and using said receiver feedback shift register to despread the transmissions of the direct sequence spread spectrum transmitter over said plurality of frequencies.

16. The method of claim 15, wherein said step of matching said feedback receiver shift register to the initial code word comprises the steps of constructing a plurality of relationships between transition matrices, a set of unknown initial states of the transmitter feedback shift register, and information represented by each transition;

deriving a plurality of linear equations from said relationships; and solving said plurality of linear equations for said set of unknown initial states when the number of linear equations exceeds the number of unknown initial states of the transmitter feedback shift register, thereby yielding the initial states of said transmitter feedback shift register.

17. The method of claim 16, wherein each of said transmissions is generated upon the occurrence of a predetermined set of code values in q designated stages of the transmitter feedback shift register, said transmitter feedback shift register having n total stages, and wherein said step of constructing said plurality of relationships comprises the steps of (a) assigning, to said q designated stages in the transmitter feedback shift register, said predetermined set of code values upon receipt of a first one of said transmissions;

(b) calculating a number of intervening clock pulses until the next consecutive transmission received at the receiver;

(c) obtaining a time-advanced transition matrix $A^p$ for the current received transmission, wherein an amount of time advancement is based upon a number of intervening clock pulses p between the occurrence of the first one of said transmissions and the occurrence of the current received transmission;

(d) deriving a linear equation according to the form $x \cdot A^p[q]=y$, wherein x represents a linear vector having a number of elements equal to the number of stages n in said transmitter feedback shift register, said linear vector comprising said predetermined set of code values at locations in said linear vector corresponding to the q designated stages in said transmitter feedback shift register and a set of n-q unknowns at locations in said linear vector corresponding to all other locations in said transmitter feedback shift register, wherein $A^p[q]$ represents a portion of a transition matrix A raised to a power equal to the number of intervening clock pulses p, said portion being those q columns in transition matrix $A^p$ which are associated with said q designated stages in the transmitter feedback shift register, and wherein y represents a linear vector having a number of elements equal to the number of said q designated stages, said elements of y being assigned said predetermined set of code values; and (e) repeating steps (b) through (d) until a sufficient number of said linear equations are derived to allow said set of unknown initial states to be solved.

18. The method of claim 15, wherein the adjustment of said feedback shift register by said amount of time since the first transmission utilized in said step of measuring relative times of arrival between consecutive transmissions comprises the step of clocking said receiver feedback shift register at an accelerated rate until it matches the transmitter feedback shift register.

19. The method of claim 15, wherein the adjustment of said feedback shift register by said amount of time since the first transmission utilized in said step of measuring relative times of arrival between consecutive transmissions comprises the step of deriving a time-advanced feedback shift register code word by obtaining a plurality of vector dot products between the initial transmitter code word and a plurality of modular feedback shift register code words, said modular feedback shift register code words derived by:

initializing a modular feedback shift register corresponding to the transmitter feedback shift register;

advancing the modular feedback shift register ahead by the number of clock intervals elapsed since the receipt of said first one of said consecutive transmissions, thereby obtaining a first modular feedback shift register code word from the contents of said modular feedback shift register; and incrementing the modular feedback shift register once for each additional bit needed for the transmitter feedback shift register, thereby obtaining successive modular feedback shift register code words from the contents of said modular feedback shift register at each increment.

20. A method for broadcasting wireless signals to selected receivers, the method comprising the steps of:

transmitting a series of frequency-hopped transmissions over a plurality of frequencies including one or more key frequencies, the transmissions on a key frequency separated by one or more clock intervals pseudo-randomly determined according to an initial code word loaded into a transmitter feedback shift register; and separately at each of a plurality of receivers:

monitoring a designated one of said key frequencies;

measuring relative times of arrival between consecutive ones of said transmissions on the receiver's designated key frequency;

determining said initial code word in the transmitter feedback shift register from the measured relative times of arrival between the consecutive transmissions on the receiver's designated key frequency;

matching a receiver feedback shift register to the initial code word, adjusted by an amount of time since receiving the first one of said consecutive transmissions on the receiver's designated key frequency; and using said receiver feedback shift register to carry out synchronized communication with the transmitter.

21. The method of claim 20, wherein said step of transmitting said series of frequency-hopped transmissions over said plurality of frequencies including one or more key frequencies comprises the step of omitting transmissions on a key frequency to prevent a receiver which is tuned to that key frequency from synchronizing to the transmitter.

22. The method of claim 20, wherein said step of using said receiver feedback shift register to carry out synchronized communication with the transmitter comprises the step of despreading said frequency-hopped transmissions to recover a data signal.

23. The method of claim 20, wherein said step of matching said feedback receiver shift register to the initial code word comprises the steps of constructing a plurality of relationships between transition matrices, a set of unknown initial states of the transmitter feedback shift register, and information represented by each transition;

deriving a plurality of linear equations from said relationships; and solving said plurality of linear equations for said set of unknown initial states when the number of linear equations exceeds the number of unknown initial states of the transmitter feedback shift register, thereby yielding the initial states of said transmitter feedback shift register.

24. The method of claim 23, wherein each of the transmissions on a particular key frequency is generated upon the occurrence of a predetermined set of code values in q designated stages of the transmitter feedback shift register, said transmitter feedback shift register having n total stages, and wherein said step of constructing said plurality of relationships comprises the steps of (a) assigning, to said q designated stages in the transmitter feedback shift register, said predetermined set of code values upon receipt of a first one of said transmissions on the receiver's designated key frequency;

(b) calculating a number of intervening clock pulses until the next consecutive transmission on the receiver's designated key frequency that is received at the receiver;

(c) obtaining a time-advanced transition matrix $A^p$ for the current received transmission on the receiver's designated key frequency, wherein an amount of time advancement is based upon a number of intervening clock pulses p between the occurrence of the first one of said transmissions on the receiver's designated key frequency and the occurrence of the current received transmission on the receiver's designated key frequency;

(d) deriving a linear equation according to the form $x \cdot A^p[q]=y$, wherein x represents a linear vector having a number of elements equal to the number of stages n in said transmitter feedback shift register, said linear vector comprising said predetermined set of code values at locations in said linear vector corresponding to the q designated stages in said transmitter feedback shift register and a set of n-q unknowns at locations in said linear vector corresponding to all other locations in said transmitter feedback shift register, wherein $A^p[q]$ represents a portion of a transition matrix A raised to a power equal to the number of intervening clock pulses p, said portion being those q columns in transition matrix $A^p$ which are associated with said q designated stages in the transmitter feedback shift register, and wherein y represents a linear vector having a number of elements equal to the number of said q designated stages, said elements of y being assigned said predetermined set of code values; and (e) repeating steps (b) through (d) until a sufficient number of said linear equations are derived to allow said set of unknown initial states to be solved.

25. The method of claim 23, wherein the adjustment of said feedback shift register by said amount of time since the first transmission utilized in said step of measuring relative times of arrival between consecutive transmissions on the receiver's designated key frequency comprises the step of clocking said receiver feedback shift register at an accelerated rate until it matches the transmitter feedback shift register.

26. The method of claim 23, wherein the adjustment of said feedback shift register by said amount of time since the first transmission utilized in said step of measuring relative times of arrival between consecutive transmissions on the receiver's designated key frequency comprises the step of deriving a time-advanced feedback shift register code word by obtaining a plurality of vector dot products between the initial transmitter code word and a plurality of modular feedback shift register code words, said modular feedback shift register code words derived by:

initializing a modular feedback shift register corresponding to the transmitter feedback shift register;

advancing the modular feedback shift register ahead by the number of clock intervals elapsed since the receipt of said first one of said consecutive transmissions on the receiver's designated key frequency, thereby obtaining a first modular feedback shift register code word from the contents of said modular feedback shift register; and incrementing the modular feedback shift register once for each additional bit needed for the transmitter feedback shift register, thereby obtaining successive modular feedback shift register code words from the contents of said modular feedback shift register at each increment.

27. The method of claim 26, wherein said step of obtaining a plurality of vector dot products between the initial transmitter code word and a plurality of modular feedback shift register code words comprises the step of modulo-two combining one or more selected elements of the initial transmitter code word together to form each bit of the time-advanced feedback shift register code word, the one or more selected elements of the initial transmitter code word being combined together based upon the code values of said plurality of modular feedback shift register code words.

28. A wireless communication system, comprising:
a spread spectrum transmitter configured to transmit a series of transmissions at a predetermined frequency, said transmissions separated by one or more clock intervals pseudo-randomly determined according to an initial code word loaded into a transmitter feedback shift register; and
a receiver comprising circuitry for receiving and synchronizing to said series of transmissions, said receiver comprising
a receiver feedback shift register;
means for measuring relative times of arrival between consecutive ones of said transmissions;
a synchronizing circuit for determining said initial code word in the transmitter feedback shift register from the measured relative times of arrival between consecutive transmissions, and matching said receiver feedback shift register to the initial code word, adjusted by an amount of time since receiving the first one of said consecutive transmissions.

29. The wireless communication system of claim 28, wherein said spread spectrum transmitter transmits, over a plurality of different frequencies including said predetermined frequency, a series of frequency hopping transmissions during a plurality of frequency hopping intervals, and
wherein said receiver feedback shift register is used for carrying out synchronized communication with the transmitter by despreading said frequency hopping transmissions to recover a data signal.

30. The wireless communication system of claim 28, wherein said receiver matches the feedback receiver shift register to the initial code word by:
constructing a plurality of relationships between transition matrices, a set of unknown initial states of the transmitter feedback shift register, and information represented by each transition;
deriving a plurality of linear equations from said relationships; and
solving said plurality of linear equations for said set of unknown initial states when the number of linear equations exceeds the number of unknown initial states of the transmitter feedback shift register, thereby yielding the initial states of said transmitter feedback shift register.

31. The wireless communication system of claim 30, wherein each of said transmissions is generated by said spread spectrum transmitter upon the occurrence of a predetermined set of code values in q designated stages of the transmitter feedback shift register, said transmitter feedback shift register having n total stages, and wherein said receiver constructs said plurality of relationships by:
(a) assigning, to said q designated stages in the transmitter feedback shift register, said predetermined set of code values upon receipt of a first one of said transmissions;
(b) calculating a number of intervening clock pulses until the next consecutive transmission received at the receiver;
(c) obtaining a time-advanced transition matrix $A^p$ for the current received transmission, wherein an amount of time advancement is based upon a number of intervening clock pulses p between the occurrence of the first one of said transmissions and the occurrence of the current received transmission;
(d) deriving a linear equation according to the form $x \cdot A^p[q]=y$, wherein x represents a linear vector having a number of elements equal to the number of stages n in said transmitter feedback shift register, said linear vector comprising said predetermined set of code values at locations in said linear vector corresponding to the q designated stages in said transmitter feedback shift register and a set of n-q unknowns at locations in said linear vector corresponding to all other locations in said transmitter feedback shift register, wherein $A^p[q]$ represents a portion of a transition matrix A raised to a power equal to the number of intervening clock pulses p, said portion being those q columns in transition matrix $A^p$ which are associated with said q designated stages in the transmitter feedback shift register, and wherein y represents a linear vector having a number of elements equal to the number of said q designated stages, said elements of y being assigned said predetermined set of code values; and
(e) repeating steps (b) through (d) until a sufficient number of said linear equations are derived to allow said set of unknown initial states to be solved.

32. The wireless communication system of claim 30, wherein said receiver further comprises a clock signal for incrementally advancing said receiver feedback shift register, and wherein the adjustment of said receiver feedback shift register is carried out by clocking said receiver feedback shift register at an accelerated rate until it matches the estimated state of said transmitter feedback shift register.

33. The wireless communication system of claim 30, wherein said receiver further comprises a modular feedback shift register configured to generate the same code sequence as the transmitter feedback shift register, and wherein the adjustment of said receiver feedback shift register is carried out by deriving a time-advanced feedback shift register code word from a plurality of vector dot products between the initial transmitter code word and a plurality of modular feedback shift register code words, said modular feedback shift register code words derived by:
initializing said modular feedback shift register with a code word of the form 100 . . . 0;
advancing the modular feedback shift register ahead by the number of clock intervals elapsed since the receipt of said first one of said consecutive transmissions, thereby obtaining a first modular feedback shift register code word from the contents of said modular feedback shift register; and
incrementing the modular feedback shift register once for each additional bit needed for the transmitter feedback shift register, thereby obtaining successive modular feedback shift register code words from the contents of said modular feedback shift register at each increment.

34. The wireless communication system of claim 33, wherein said plurality of vector dot products are obtained by modulo-two combining one or more selected elements of the initial transmitter code word together to form each bit of the time-advanced feedback shift register code word, the one or more selected elements of the initial transmitter code word being combined together based upon the code values of said plurality of modular feedback shift register code words.

35. The wireless communication system of claim 28, wherein said transmitter is configured to transmit a second series of transmissions at a second predetermined frequency, said transmissions in said second series separated by one or more clock intervals pseudo-randomly determined according to said initial code word loaded into the transmitter feedback shift register, and wherein the wireless communication system further comprises a second receiver, comprising:
- a second receiver feedback shift register;
- means for measuring relative times of arrival between consecutive ones of said transmissions at said second predetermined frequency;
- a second synchronizing circuit for determining said initial code word in the transmitter feedback shift register from the measured relative times of arrival between the consecutive transmissions at said second predetermined frequency, and for matching said receiver feedback shift register to the initial code word, adjusted by an amount of time since receiving the first one of said consecutive transmissions at said second predetermined frequency.

36. The wireless communication system of claim 28, wherein each of said transmissions from said spread spectrum transmitter comprises a spread spectrum code, and wherein said receiver comprises a correlator for detecting each of said transmissions, said correlator outputting a correlation pulse when each transmission is received to indicate the arrival of the transmission.

37. In a frequency hopping spread spectrum communication system, wherein a frequency hopping transmitter transmits in a pseudo-random manner across a plurality of frequencies including a key frequency, the transmissions over said key frequency being separated by one or more clock intervals pseudo-randomly determined according to an initial code word loaded into a transmitter feedback shift register, a receiver, comprising:
- a receiver feedback shift register;
- a receiving circuit tuned to said key frequency for detecting the transmissions over said key frequency;
- a clocking circuit for measuring relative times of arrival between consecutive ones of said transmissions detected by said receiving circuit; and
- a synchronizing circuit for determining said initial code word in the transmitter feedback shift register from the measured relative times of arrival between the consecutive transmissions, and matching said receiver feedback shift register to the initial code word, adjusted by an amount of time since receiving the first one of said consecutive transmissions.

38. The receiver of claim 37, wherein said synchronizing circuit matches the feedback receiver shift register to the initial code word by:
- constructing a plurality of relationships between transition matrices, a set of unknown initial states of the transmitter feedback shift register, and information represented by each transition;
- deriving a plurality of linear equations from said relationships; and
- solving said plurality of linear equations for said set of unknown initial states when the number of linear equations exceeds the number of unknown initial states of the transmitter feedback shift register, thereby yielding the initial states of said transmitter feedback shift register.

39. The receiver claim 37, wherein each of said transmissions is generated by said frequency hopping transmitter upon the occurrence of a predetermined set of code values in q designated stages of the transmitter feedback shift register, said transmitter feedback shift register having n total stages, and wherein said synchronizing circuit constructs said plurality of relationships by:

(a) assigning, to said q designated stages in the transmitter feedback shift register, said predetermined set of code values upon receipt of a first one of said transmissions;

(b) calculating a number of intervening clock pulses until the next consecutive transmission received at the receiver;

(c) obtaining a time-advanced transition matrix $A^p$ for the current received transmission, wherein an amount of time advancement is based upon a number of intervening clock pulses p between the occurrence of the first one of said transmissions and the occurrence of the current received transmission;

(d) deriving a linear equation according to the form $x \cdot A^p[q] = y$, wherein x represents a linear vector having a number of elements equal to the number of stages n in said transmitter feedback shift register, said linear vector comprising said predetermined set of code values at locations in said linear vector corresponding to the q designated stages in said transmitter feedback shift register and a set of n-q unknowns at locations in said linear vector corresponding to all other locations in said transmitter feedback shift register, wherein $A^p[q]$ represents a portion of a transition matrix A raised to a power equal to the number of intervening clock pulses p, said portion being those q columns in transition matrix $A^p$ which are associated with said q designated stages in the transmitter feedback shift register, and wherein y represents a linear vector having a number of elements equal to the number of said q designated stages, said elements of y being assigned said predetermined set of code values; and (e) repeating steps (b) through (d) until a sufficient number of said linear equations are derived to allow said set of unknown initial states to be solved.

40. A wireless communication system, comprising:
- a spread spectrum transmitter configured to transmit a series of frequency-hopped transmissions over a plurality of frequencies including one or more key frequencies, the transmissions on a key frequency separated by one or more clock intervals pseudo-randomly determined according to an initial code word loaded into a transmitter feedback shift register; and
- a plurality of receivers each attuned to a designated key frequency, each of said receivers comprising
  - a receiver feedback shift register;
  - means for measuring relative times of arrival between consecutive ones of said transmissions on the receiver's designated key frequency;
  - a synchronizing circuit for determining said initial code word in the transmitter feedback shift register from the measured relative times of arrival between the consecutive transmissions on the receiver's designated key frequency, and matching said receiver feedback shift register to the initial code word, adjusted by an amount of time since receiving the first one of said consecutive transmissions on the receiver's designated key frequency.

41. The wireless communication system of claim 40, wherein each of said receivers matches the feedback receiver shift register to the initial code word by:
- constructing a plurality of relationships between transition matrices, a set of unknown initial states of the transmitter feedback shift register, and information represented by each transition on the receiver's designated key frequency;
- deriving a plurality of linear equations from said relationships; and solving said plurality of linear equations for said set of unknown initial states when the number of linear equations exceeds the number of unknown initial states of the transmitter feedback shift register, thereby yielding the initial states of said transmitter feedback shift register.

42. The wireless communication system of claim 41, wherein each of the transmissions on a particular key frequency is generated upon the occurrence of a predetermined set of code values in q designated stages of the transmitter feedback shift register, said transmitter feedback shift register having n total stages, and wherein each receiver constructs said plurality of relationships by:
  (a) assigning, to said q designated stages in the transmitter feedback shift register, said predetermined set of code values upon receipt of a first one of said transmissions on the receiver's designated key frequency;
  (b) calculating a number of intervening clock pulses until the next consecutive transmission on the receiver's designated key frequency that is received at the receiver;
  (c) obtaining a time-advanced transition matrix $A^p$ for the current received transmission on the receiver's designated key frequency, wherein an amount of time advancement is based upon a number of intervening clock pulses p between the occurrence of the first one of said transmissions on the receiver's designated key frequency and the occurrence of the current received transmission on the receiver's designated key frequency;
  (d) deriving a linear equation according to the form $x \cdot A^p[q]=y$, wherein x represents a linear vector having a number of elements equal to the number of stages n in said transmitter feedback shift register, said linear vector comprising said predetermined set of code values at locations in said linear vector corresponding to the q designated stages in said transmitter feedback shift register and a set of n-q unknowns at locations in said linear vector corresponding to all other locations in said transmitter feedback shift register, wherein $A^p[q]$ represents a portion of a transition matrix A raised to a power equal to the number of intervening clock pulses p, said portion being those q columns in transition matrix $A^p$ which are associated with said q designated stages in the transmitter feedback shift register, and wherein y represents a linear vector having a number of elements equal to the number of said q designated stages, said elements of y being assigned said predetermined set of code values; and
  (e) repeating steps (b) through (d) until a sufficient number of said linear equations are derived to allow said set of unknown initial states to be solved.

43. A method for synchronizing communication, comprising the steps of:
  transmitting, from a transmitter, a signal having an observable parameter which is pseudo-randomly varied;
  receiving said signal at a receiver;
  measuring relative times between recurrences of a selected value of said observable parameter being pseudo-randomly varied;
  determining an initial state of said transmitter based upon said measured relative times; and
  synchronizing said receiver to an estimated current state of said transmitter using said determined initial state as a starting reference.

* * * * *